United States Patent
Wang et al.

(10) Patent No.: US 11,765,754 B2
(45) Date of Patent: Sep. 19, 2023

(54) RESOURCE SCHEDULING METHOD AND TERMINAL DEVICE

(71) Applicant: Huawei Technologies Co., Ltd., Shenzhen (CN)

(72) Inventors: Fei Wang, Shenzhen (CN); Zhenning Wang, Shanghai (CN); Haibo Chen, Shanghai (CN); Jian Cheng, Hangzhou (CN); Hongjiang Zhao, Hangzhou (CN); Shanxi Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/018,551

(22) Filed: Sep. 11, 2020

(65) Prior Publication Data

US 2020/0413423 A1    Dec. 31, 2020

Related U.S. Application Data

(63) Continuation of application No. PCT/CN2019/090573, filed on Jun. 10, 2019.

(30) Foreign Application Priority Data

Oct. 11, 2018    (CN) .......................... 201811184979.7

(51) Int. Cl.
*H04W 72/00* (2023.01)
*H04W 72/52* (2023.01)
(Continued)

(52) U.S. Cl.
CPC ....... *H04W 72/52* (2023.01); *H04W 72/0446* (2013.01); *H04W 72/0466* (2013.01); *H04W 72/1263* (2013.01)

(58) Field of Classification Search
CPC .. G06F 1/329; G06F 9/5094; H04W 72/0446; H04W 72/0466; H04W 72/1252; H04W 72/1263

See application file for complete search history.

(56) References Cited

U.S. PATENT DOCUMENTS 7,526,682 B1    4/2009  Chacko et al.
8,200,594 B1 *  6/2012  Bleiweiss ............... A63F 13/67
                                                   706/45

(Continued)

FOREIGN PATENT DOCUMENTS

CN    104460934 A    3/2015
CN    105376236 A    3/2016

(Continued)

OTHER PUBLICATIONS

Reddy, B., "Runtime Energy Management of Concurrent Applications for Multicore Platforms," University of Southampton, XP055806586, Apr. 2019, 202 pages.

(Continued)

*Primary Examiner* — Jason E Mattis
*Assistant Examiner* — Bao G Nguyen
(74) *Attorney, Agent, or Firm* — Conley Rose, P.C.

(57) ABSTRACT

A resource scheduling method implemented by a device, where the resource scheduling method includes determining a load characteristic of a frame drawing thread, where the frame drawing thread draws an image frame determining a target resource scheduling manner based on the load characteristic, and scheduling a resource for the frame drawing thread in the target resource scheduling manner.

19 Claims, 9 Drawing Sheets

(51) Int. Cl.
*H04W 72/0446* (2023.01)
*H04W 72/044* (2023.01)
*H04W 72/1263* (2023.01)

(56) References Cited

U.S. PATENT DOCUMENTS

| | | | |
|---|---|---|---|
| 2002/0106184 A1* | 8/2002 | Belley | H04N 5/262 386/281 |
| 2008/0163217 A1* | 7/2008 | Accapadi | G06F 9/526 718/100 |
| 2010/0169489 A1 | 7/2010 | Akiyama et al. | |
| 2011/0231857 A1* | 9/2011 | Zaroo | G06F 9/5016 718/104 |
| 2011/0246995 A1 | 10/2011 | Fedorova et al. | |
| 2015/0089249 A1* | 3/2015 | Hannon | G06F 9/5094 713/300 |
| 2015/0121048 A1 | 4/2015 | Lukefahr et al. | |
| 2015/0339002 A1* | 11/2015 | Arnold | G06T 13/00 715/854 |
| 2017/0061568 A1 | 3/2017 | Metz et al. | |
| 2017/0090988 A1* | 3/2017 | Young | G06F 9/5094 |
| 2017/0195247 A1 | 7/2017 | Tao et al. | |
| 2017/0206111 A1* | 7/2017 | Kannan | G06F 11/3452 |
| 2017/0308411 A1 | 10/2017 | Brill | |
| 2018/0046512 A1 | 2/2018 | Kang et al. | |
| 2018/0349191 A1* | 12/2018 | Dorsey | G06F 9/4856 |
| 2020/0073714 A1* | 3/2020 | Venkataraman | G06F 1/3243 |

FOREIGN PATENT DOCUMENTS

| | | |
|---|---|---|
| JP | 2010152738 A | 7/2010 |
| JP | 2012511204 A | 5/2012 |
| KR | 20170120022 A | 10/2017 |
| KR | 20180018302 A | 2/2018 |
| KR | 20180048886 A | 5/2018 |
| WO | 2010067377 A2 | 6/2010 |

OTHER PUBLICATIONS

Reddy, B., et al., "Inter-Cluster Thread-to-Core Mapping and DVFS on Heterogeneous Multi-Cores," IEEE Transactions on Multi-Scale Computing Systems, vol. 4, No. 3, Jul.-Sep. 2018, XP055806626, 14 pages.
Lashgar, A., et al., "Performance in GPU Architectures: Potentials and Distances," Computer Science, 2011, 15 pages.
Fedorova, A., et al., "Performance of Multithreaded Chip Multi-processors and Implications for Operating System Design," Proceedings of the 2005 USENIX Annual Technical Conference, Apr. 10-15, 2005, Anaheim, CA, USA, 21 pages.
Fan Wu et al., "Adaptive CPU Scheduling to Conserve Energy in Real-Time Mobile Graphics Applications," Proceedings of International Symposium on Visual Computing, 2008, 10 pages.
Zhenning Wang et al "Quality of Service Support for Fine-Grained Sharing on GPUs," Proceedings of the 44th Annual International Symposium on Computer Architecture, ISCA 17, ACM Press, New York, New York, USA, Jun. 24, 2017, XP058369107, 13 pages.
Jason Jong Kyu Park et al., Chimera: Collaborative Preemption for Multitasking on a Shared GPU, https://dl.acm.org/doi/10.1145/2694344.2694346, Mar. 14-18, 2015, XP058505973, 14 pages.

* cited by examiner

RESOURCE SCHEDULING METHOD AND TERMINAL DEVICE

CROSS-REFERENCE TO RELATED APPLICATIONS

This application is a continuation of International Patent Application No. PCT/CN2019/090573 filed on Jun. 10, 2019, which claims priority to Chinese Patent Application No. 201811184979.7 filed on Oct. 11, 2018. The disclosures of the aforementioned applications are hereby incorporated by reference in their entireties.

TECHNICAL FIELD

This application relates to the field of terminal devices, and in particular, to a resource scheduling method and a terminal device.

BACKGROUND

As performance of a terminal device is improved, power consumption of the terminal device is also increased. However, a battery capacity is increased very slowly, and cannot keep pace with performance improvement of the terminal device. Therefore, to ensure the performance of the terminal device and further meet user experience, for a task currently executed by the terminal device, a resource needs to be scheduled based on a load status of the current task.

In a conventional solution, usually, a load status of a task currently executed by a terminal device in a historical period of time is collected, and a resource is scheduled for the currently executed task based on the collected load status. For example, when load of the currently executed task is relatively large, a working frequency of a central processing unit (CPU) may be increased, or when load of the currently executed task is relatively small, a working frequency of a CPU may be reduced. However, in the conventional solution, a resource is scheduled based on a load status in a previous period of time. Therefore, the resource scheduling has low accuracy, and is not performed in a timely manner.

SUMMARY

This application provides a resource scheduling method and a terminal device, to schedule a resource more accurately.

According to a first aspect, a resource scheduling method is provided, where the method is applied to a terminal device, and the method includes determining a load characteristic of a frame drawing thread, where the frame drawing thread is used to draw an image frame, determining a target resource scheduling manner based on the load characteristic of the frame drawing thread, and scheduling a resource for the frame drawing thread in the target resource scheduling manner.

The terminal device may be a mobile terminal (for example, a smartphone), a computer, a personal digital assistant, a wearable device, a vehicle-mounted device, an internet of things device, or the like. Alternatively, the terminal device may be another device that can display an image.

The terminal device may be a device that runs various operating systems. For example, the terminal device may be a device that runs an ANDROID system, a device that runs an IOS system, or a device that runs a WINDOWS system.

When a resource is being scheduled for the frame drawing thread in the target resource scheduling manner, a computing resource may be scheduled for the frame drawing thread (for example, a core in a CPU is scheduled to execute the frame drawing thread), a storage resource may be scheduled for the frame drawing thread (for example, some storage units are scheduled to store data in a running process of the frame drawing thread), or both a computing resource and a storage resource may be scheduled for the frame drawing thread.

The frame drawing thread may be all or some threads for drawing the image frame.

It should be understood that the frame drawing thread may be determined before the load characteristic of the frame drawing thread is determined.

Optionally, determining the frame drawing thread includes determining, as the frame drawing thread, a thread for calling a key frame drawing function in a process of drawing the image frame.

The key frame drawing function may be some key functions in the process of drawing the image frame, and the key frame drawing function may be preset. Further, the key frame drawing function may be determined based on a type of an operating system used by the terminal device, and key frame drawing functions corresponding to different types of operating systems may be different. For example, a key frame drawing function corresponding to the IOS system is different from a key frame drawing function corresponding to the ANDROID system.

In this application, because an execution speed of the frame drawing thread is directly related to user experience, determining the target resource scheduling manner using the load characteristic of the frame drawing thread and further directly scheduling a resource for the frame drawing thread in the target resource scheduling manner can implement finer-granularity resource scheduling such that resource scheduling is more specific and a resource scheduling effect is better.

With reference to the first aspect, in some implementations of the first aspect, the load characteristic of the frame drawing thread is used to indicate a resource requirement feature of the frame drawing thread.

Further, the resource requirement feature of the frame drawing thread may indicate whether load of the frame drawing thread is computing-intensive or resource-intensive such that the corresponding target resource scheduling manner is subsequently determined.

For example, when the load of the frame drawing thread is computing-intensive load, a computing resource may be mainly scheduled when a resource is being scheduled for the frame drawing thread, or when the load of the frame drawing thread is resource-intensive load, a storage resource may be mainly scheduled when a resource is being scheduled for the frame drawing thread.

When the resource requirement feature of the frame drawing thread indicates that the load of the frame drawing thread is computing-intensive and resource-intensive, both a computing resource and a storage resource may be scheduled when a resource is being scheduled for the frame drawing thread.

With reference to the first aspect, in some implementations of the first aspect, the load characteristic of the frame drawing thread includes at least one of an average quantity of cycles per instruction (CPI), a quantity of branch instructions, and a cache miss rate of the frame drawing thread.

In this application, when one or more parameters such as the average quantity of CPI, the quantity of branch instructions, and the cache miss rate of the frame drawing thread are collected, the load characteristic of the frame drawing thread can be directly obtained such that complexity of obtaining the load characteristic of the frame drawing thread is reduced.

It should be understood that one or more of parameters such as the average quantity of CPI, the quantity of branch instructions, and the cache miss rate of the frame drawing thread may be directly used to indicate the load characteristic of the frame drawing thread, or parameters obtained after processing one or more of parameters such as the average quantity of CPI, the quantity of branch instructions, and the cache miss rate of the frame drawing thread may be used to indicate the load characteristic of the frame drawing thread.

With reference to the first aspect, in some implementations of the first aspect, the load characteristic of the frame drawing thread is determined based on at least one of an average quantity of CPI, a quantity of branch instructions, and a cache miss rate of the frame drawing thread in a first time interval (or referred to as a first time period), and the first time interval is a period of time between start of execution of the frame drawing thread and end of the execution of the frame drawing thread.

The average quantity of CPI, the quantity of branch instructions, and the cache miss rate of the frame drawing thread in the first time interval may be referred to as performance indicator data of the frame drawing thread in the first time interval. When the load characteristic of the frame drawing thread is being determined, some parameters in the performance indicator data of the frame drawing thread in the first time interval may be directly determined as the load characteristic of the frame drawing thread, or processing or an operation may be performed on the performance indicator data of the frame drawing thread in the first time interval (for example, a division operation is performed on two parameters in the performance indicator data, or a hash operation is performed on some parameters in the performance indicator data), and data obtained after the processing or the operation is determined as the load characteristic of the frame drawing thread.

Optionally, determining the load characteristic of the frame drawing thread includes recording performance indicator data of the frame drawing thread in a first time interval, where the first time interval is a period of time between start of execution of the frame drawing thread and end of the execution of the frame drawing thread, and the performance indicator data of the frame drawing thread in the first time interval includes at least one of an average quantity of CPI, a quantity of branch instructions, a cache miss rate, and a program counter of the frame drawing thread in the first time interval, and determining the load characteristic of the frame drawing thread based on the performance indicator data of the frame drawing thread in the first time interval.

Optionally, a length of the first time interval is determined based on performance indicator data that can be collected.

Further, the first time interval may be set to a time required for collecting sufficient performance indicator data. In addition, a proportion threshold may be set for the first time when the first time interval is being set, and a proportion of the first time interval to a frame drawing time of an image frame cannot exceed the proportion threshold.

With reference to the first aspect, in some implementations of the first aspect, determining a target resource scheduling manner based on the load characteristic of the frame drawing thread includes determining a predicted load value of the frame drawing thread based on the load characteristic of the frame drawing thread, and determining the target resource scheduling manner based on the load characteristic of the frame drawing thread, the predicted load value of the frame drawing thread, and a preset target frame rate.

With reference to the first aspect, in some implementations of the first aspect, determining the target resource scheduling manner based on the load characteristic of the frame drawing thread, the predicted load value of the frame drawing thread, and a preset target frame rate includes determining, based on the load characteristic of the frame drawing thread, the predicted load value of the frame drawing thread, and the preset target frame rate, at least one resource scheduling manner of scheduling a resource for the frame drawing thread, and determining a resource scheduling manner corresponding to lowest power consumption in the at least one resource scheduling manner as the target resource scheduling manner.

In this application, a resource scheduling manner corresponding to lowest power consumption in a plurality of available resource scheduling manners is determined as the target resource scheduling manner such that power consumption can be reduced as much as possible while a resource scheduling requirement of the frame drawing thread is met, thereby implementing a balance between performance and power consumption.

With reference to the first aspect, in some implementations of the first aspect, determining a target resource scheduling manner based on the load characteristic of the frame drawing thread includes determining a predicted load value of the frame drawing thread based on the load characteristic of the frame drawing thread, and determining the target resource scheduling manner based on the load characteristic of the frame drawing thread, the predicted load value of the frame drawing thread, and first mapping relationship information, where the first mapping relationship information includes a plurality of pieces of load information and a resource scheduling manner corresponding to each of the plurality of pieces of load information, and each of the plurality of pieces of load information includes one load characteristic and one load value.

Optionally, the first mapping relationship information is determined based on historical information recorded by the terminal device, and the historical information includes a load characteristic, a load value, and a corresponding resource scheduling manner of an image frame preceding the image frame drawn using the frame drawing thread.

The first mapping relationship information may be in a form of a table, or may be information of any other form for recording a load characteristic, a load value, and a corresponding resource scheduling manner.

In this application, determining the target resource scheduling manner based on the load characteristic and the predicted load value of the frame drawing thread and the first mapping relationship information can reduce complexity of determining the target resource scheduling manner compared with determining the target resource scheduling manner through direct calculation.

Optionally, the method further includes recording the load characteristic of the frame drawing thread, the predicted load value of the frame drawing thread, and the target resource scheduling manner, to update the first mapping relationship information.

The first mapping relationship information can include more types of load information by updating the first mapping relationship information such that the resource scheduling manner is subsequently determined based on the first mapping relationship information.

With reference to the first aspect, in some implementations of the first aspect, determining a predicted load value of the frame drawing thread based on the load characteristic of the frame drawing thread includes determining the predicted load value of the frame drawing thread based on the load characteristic of the frame drawing thread and second mapping relationship information, where the second mapping relationship information includes a plurality of load characteristics and a load value corresponding to each of the plurality of load characteristics.

With reference to the first aspect, in some implementations of the first aspect, determining the predicted load value of the frame drawing thread based on the load characteristic of the frame drawing thread and second mapping relationship information includes when the plurality of load characteristics in the second mapping relationship information include a reference load characteristic, determining a load value corresponding to the reference load characteristic as the predicted load value of the frame drawing thread, where a similarity between the reference load characteristic and the load characteristic of the frame drawing thread is greater than or equal to a similarity threshold.

With reference to the first aspect, in some implementations of the first aspect, determining the predicted load value of the frame drawing thread based on the load characteristic of the frame drawing thread and second mapping relationship information includes when the plurality of load characteristics in the second mapping relationship information do not include the reference load characteristic, determining, as the predicted load value of the frame drawing thread, a load value of a frame preceding the image frame drawn using the frame drawing thread, where a similarity between the reference load characteristic and the load characteristic of the frame drawing thread is greater than or equal to a similarity threshold.

Optionally, the second mapping relationship information is determined based on historical information recorded by the terminal device, and the historical information may include a load characteristic and a corresponding load value of the image frame drawn using the frame drawing thread.

The second mapping relationship information may be in a form of a table, or may be information of any other form for recording a load characteristic and a corresponding load value.

In this application, the predicted load value of the frame drawing thread can be determined relatively conveniently using the load characteristic of the frame drawing thread and the second mapping relationship, and this is simpler than directly determining the predicted load value of the frame drawing thread by analyzing or calculating the load value of the frame drawing thread based on the load characteristic of the frame drawing thread.

Optionally, the method further includes recording the load characteristic of the frame drawing thread and the predicted load value of the frame drawing thread, to update the second mapping relationship information.

The second mapping relationship information can include more types of load characteristics by updating the second mapping relationship information such that the predicted load value of the frame drawing thread is subsequently determined based on the second mapping relationship information.

With reference to the first aspect, in some implementations of the first aspect, determining a target resource scheduling manner based on the load characteristic of the frame drawing thread includes determining the target resource scheduling manner based on the load characteristic of the frame drawing thread and third mapping relationship information, where the third mapping relationship information includes a plurality of load characteristics and a resource scheduling manner corresponding to each of the plurality of load characteristics.

With reference to the first aspect, in some implementations of the first aspect, determining the target resource scheduling manner based on the load characteristic of the frame drawing thread and third mapping relationship information includes when the plurality of load characteristics in the third mapping relationship information include a reference load characteristic, determining a resource scheduling manner corresponding to the reference load characteristic as the target resource scheduling manner, where a similarity between the reference load characteristic and the load characteristic of the frame drawing thread is greater than or equal to a similarity threshold.

With reference to the first aspect, in some implementations of the first aspect, determining the target resource scheduling manner based on the load characteristic of the frame drawing thread and third mapping relationship information includes when the plurality of load characteristics in the third mapping relationship information do not include the reference load characteristic, determining, as the target resource scheduling manner, a resource scheduling manner of a frame drawing thread of a frame preceding the image frame drawn using the frame drawing thread, where a similarity between the reference load characteristic and the load characteristic of the frame drawing thread is greater than or equal to a similarity threshold.

Optionally, the third mapping relationship information is determined based on historical information recorded by the terminal device, and the historical information includes a load characteristic and a corresponding resource scheduling manner of an image frame preceding the image frame drawn using the frame drawing thread.

The third mapping relationship information may be in a form of a table, or may be information of any other form for recording a load characteristic and a corresponding resource scheduling manner.

In this application, the target resource scheduling manner is directly determined using the load characteristic of the frame drawing thread and information about a mapping relationship between a load characteristic and a resource scheduling manner such that a process of determining the predicted load value of the frame drawing thread can be omitted, and complexity of determining the target resource scheduling manner can be further reduced.

Optionally, the method further includes recording the load characteristic of the frame drawing thread and the target resource scheduling manner, to update the third mapping relationship information.

The third mapping relationship information can include more types of load characteristics by updating the third mapping relationship information such that the resource scheduling manner corresponding to the frame drawing thread is subsequently determined based on the third mapping relationship information.

With reference to the first aspect, in some implementations of the first aspect, the method further includes determining an association thread of the frame drawing thread, where the association thread is a thread capable of causing the frame drawing thread to sleep, and scheduling a resource for the association thread to accelerate execution of the association thread.

Causing the frame drawing thread to sleep may be causing the frame drawing thread to sleep intermittently or stop working.

In this application, a resource is scheduled for the association thread such that an execution speed of the frame drawing thread can be indirectly increased, and user experience is improved.

With reference to the first aspect, in some implementations of the first aspect, the execution of the frame drawing thread is not completed within a predetermined time, and the method further includes scheduling an additional resource for the frame drawing thread to accelerate the execution of the frame drawing thread, where the predetermined time is a time required for completing the execution of the frame drawing thread when a resource is scheduled for the frame drawing thread in the target resource scheduling manner.

It should be understood that drawing of the image frame corresponding to the frame drawing thread is completed once the execution of the frame drawing thread is completed. If the execution of the frame drawing thread is not completed within the predetermined time, it indicates that fewer resources may be scheduled for the frame drawing thread in the target resource scheduling manner. In this case, an additional resource needs to be scheduled for the frame drawing thread to accelerate the execution of the frame drawing thread, thereby improving user experience.

With reference to the first aspect, in some implementations of the first aspect, there is a positive correlation relationship between a size of the additional resource and a first difference, and the first difference is a difference between a time point of scheduling the additional resource and an end time point of the preset time.

When the first difference is larger, the predetermined time expires earlier. More resources are scheduled for the frame drawing thread such that the execution of the frame drawing thread is completed as soon as possible.

It should be understood that scheduling the additional resource for the frame drawing thread is stopped when the execution of the frame drawing thread is completed.

According to a second aspect, a resource scheduling method is provided, where the method is applied to a terminal device, and the method includes determining a load characteristic of a frame drawing thread, where the frame drawing thread is used to draw an image frame, determining a target predicted load value of the frame drawing thread based on the load characteristic of the frame drawing thread and an application scenario corresponding to the frame drawing thread, determining a target resource scheduling manner based on the load characteristic of the frame drawing thread, the target predicted load value of the frame drawing thread, and a preset target frame rate, and scheduling a resource for the frame drawing thread in the target resource scheduling manner.

The terminal device may be a mobile terminal (for example, a smartphone), a computer, a personal digital assistant, a wearable device, a vehicle-mounted device, an internet of things device, or the like. Alternatively, the terminal device may be another device that can display an image.

The terminal device may be a device that runs various operating systems. For example, the terminal device may be a device that runs an ANDROID system, a device that runs an IOS system, or a device that runs a WINDOWS system.

The application scenario corresponding to the frame drawing thread may be a type of an application program in which the frame drawing thread is located. For example, the application scenario corresponding to the frame drawing thread may be a video application program, a game application program, or another application program (for example, WECHAT, TAOBAO, or WEIBO) in which interaction with a user is required.

In addition, the application scenario corresponding to the frame drawing thread may be a phase of an application program in which the frame drawing thread is located. For example, the application scenario corresponding to the frame drawing thread may be a start phase, an end phase, or the like of the application program in which the frame drawing thread is located.

Alternatively, the application scenario corresponding to the frame drawing thread may be a phase when an application program in which the frame drawing thread is located is run. For example, the application scenario corresponding to the frame drawing thread may be an interface (a chat interface or an interface in which a small video is open) of WECHAT.

It should be understood that the frame drawing thread may be determined before the load characteristic of the frame drawing thread is determined.

Optionally, determining the frame drawing thread includes determining, as the frame drawing thread, a thread for calling a key frame drawing function in a process of drawing an image frame.

The key frame drawing function may be some key functions in the process of drawing an image frame, and the key frame drawing function may be preset. Further, the key frame drawing function may be determined based on a type of an operating system used by the terminal device, and different types of operating systems may correspond to different key frame drawing functions. For example, a key frame drawing function corresponding to the IOS system is different from a key frame drawing function corresponding to the ANDROID system.

In this application, the predicted load value of the frame drawing thread can be determined more properly based on the load characteristic of the frame drawing thread and the application scenario corresponding to the frame drawing thread, and further, the target resource scheduling manner can be determined more properly, to implement finer-granularity resource scheduling such that resource scheduling is more specific and a resource scheduling effect is better.

With reference to the second aspect, in some implementations of the second aspect, determining a target predicted load value of the frame drawing thread based on the load characteristic of the frame drawing thread and an application scenario corresponding to the frame drawing thread includes determining a first predicted load value of the frame drawing thread based on the load characteristic of the frame drawing thread, determining a second predicted load value of the frame drawing thread based on the application scenario corresponding to the frame drawing thread and fourth mapping relationship information, where the fourth mapping relationship information includes a plurality of application scenarios and a load value corresponding to each of the plurality of application scenarios, and determining the target predicted load value based on the first predicted load value and the second predicted load value.

In this application, predicted load values are respectively determined based on the load characteristic and the application scenario of the frame drawing thread, and then the final target predicted load value is determined based on the obtained two predicted load values such that the target load value can be better determined, and the target resource scheduling manner can be better determined.

Optionally, determining the target predicted load value based on the first predicted load value and the second predicted load value includes determining a maximum load value in the first predicted load value and the second predicted load value as the target predicted load value.

Optionally, determining the target predicted load value based on the first predicted load value and the second predicted load value includes determining a minimum load value in the first predicted load value and the second predicted load value as the target predicted load value.

Optionally, determining the target predicted load value based on the first predicted load value and the second predicted load value includes determining the target predicted load value based on a formula $C = A \times C1 + B \times C2$.

$C1$ is the first predicted load value, $C2$ is the second predicted load value, $C$ is the target predicted load value, $A$ is a first weighting coefficient, and $B$ is a second weighting coefficient.

When the application scenario has relatively large impact on the load value, $A$ may be set to a relatively large value, or when the application scenario has relatively small impact on the load value, $A$ may be set to a relatively small value.

Optionally, determining the target predicted load value based on the first predicted load value and the second predicted load value includes determining an average value of the first predicted load value and the second predicted load value as the target predicted load value.

Optionally, determining a target predicted load value of the frame drawing thread based on the load characteristic of the frame drawing thread and an application scenario corresponding to the frame drawing thread includes when the application scenario corresponding to the frame drawing thread is a start scenario, determining the target predicted load value of the frame drawing thread based on the application scenario corresponding to the frame drawing thread and fourth mapping relationship information, where the fourth mapping relationship information includes a plurality of application scenarios and a load value corresponding to each of the plurality of application scenarios.

When the scenario corresponding to the frame drawing thread is the start scenario, because a load value corresponding to the start scenario is relatively large, the target predicted load value of the frame drawing thread may be directly determined based on the application scenario of the frame drawing thread.

Optionally, determining a target predicted load value of the frame drawing thread based on the load characteristic of the frame drawing thread and an application scenario corresponding to the frame drawing thread includes when the application scenario corresponding to the frame drawing thread is a scenario other than a start scenario, determining the target predicted load value based on the load characteristic of the frame drawing thread.

With reference to the second aspect, in some implementations of the second aspect, the load characteristic of the frame drawing thread is used to indicate a resource requirement feature of the frame drawing thread.

Further, the resource requirement feature of the frame drawing thread may indicate whether load of the frame drawing thread is computing-intensive or resource-intensive such that the corresponding target resource scheduling manner is subsequently determined.

For example, when the load of the frame drawing thread is computing-intensive load, a computing resource may be mainly scheduled when a resource is being scheduled for the frame drawing thread, or when the load of the frame drawing thread is resource-intensive load, a storage resource may be mainly scheduled when a resource is being scheduled for the frame drawing thread.

When the resource requirement feature of the frame drawing thread indicates that the load of the frame drawing thread is computing-intensive and resource-intensive, both a computing resource and a storage resource may be scheduled when a resource is being scheduled for the frame drawing thread.

With reference to the second aspect, in some implementations of the second aspect, the load characteristic of the frame drawing thread includes at least one of an average quantity of CPI, a quantity of branch instructions, and a cache miss rate of the frame drawing thread.

In this application, when one or more of parameters such as the average quantity of CPI, the quantity of branch instructions, and the cache miss rate of the frame drawing thread are collected, the load characteristic of the frame drawing thread can be directly obtained such that complexity of obtaining the load characteristic of the frame drawing thread is reduced.

It should be understood that one or more parameters such as the average quantity of CPI, the quantity of branch instructions, and the cache miss rate of the frame drawing thread may be directly used to indicate the load characteristic of the frame drawing thread. The load characteristic of the frame drawing thread is obtained once these parameters of the frame drawing thread are obtained.

With reference to the second aspect, in some implementations of the second aspect, the load characteristic of the frame drawing thread is determined based on at least one of an average quantity of CPI, a quantity of branch instructions, and a cache miss rate of the frame drawing thread in a first time interval, and the first time interval is a period of time between start of execution of the frame drawing thread and end of the execution of the frame drawing thread.

The average quantity of CPI, the quantity of branch instructions, and the cache miss rate of the frame drawing thread in the first time interval may be referred to as performance indicator data of the frame drawing thread in the first time interval. When the load characteristic of the frame drawing thread is being determined, some parameters in the performance indicator data of the frame drawing thread in the first time interval may be directly determined as the load characteristic of the frame drawing thread, or processing or an operation may be performed on the performance indicator data of the frame drawing thread in the first time interval (for example, a division operation is performed on two parameters in the performance indicator data, or a hash operation is performed on some parameters in the performance indicator data), and data obtained after the processing or the operation is determined as the load characteristic of the frame drawing thread.

With reference to the second aspect, in some implementations of the second aspect, the execution of the frame drawing thread is not completed within a predetermined time, and the method further includes scheduling an additional resource for the frame drawing thread to accelerate the execution of the frame drawing thread, where the predetermined time is a time required for completing the execution of the frame drawing thread when a resource is scheduled for the frame drawing thread in the target resource scheduling manner.

It should be understood that if drawing of the frame drawing thread is not completed within the predetermined time, it indicates that fewer resources may be scheduled for the frame drawing thread in the target resource scheduling manner. In this case, an additional resource needs to be scheduled for the frame drawing thread to accelerate the execution of the frame drawing thread, thereby improving user experience.

With reference to the second aspect, in some implementations of the second aspect, there is a positive correlation relationship between a size of the additional resource and a first difference, and the first difference is a difference between a time point of scheduling the additional resource and an end time point of the preset time.

When the first difference is larger, the predetermined time expires earlier. More resources are scheduled for the frame drawing thread such that the execution of the frame drawing thread is completed as soon as possible.

According to a third aspect, a terminal device is provided, where the terminal device includes a module configured to perform the method in any one of the first aspect and the implementations of the first aspect.

According to a fourth aspect, a terminal device is provided, where the terminal device includes a module configured to perform the method in any one of the second aspect and the implementations of the second aspect.

According to a fifth aspect, a terminal device is provided, where the terminal device includes a memory and a processor, the memory is configured to store a program, the processor is configured to execute the program, and when executing the program, the processor is configured to perform the method in any one of the first aspect and the implementations of the first aspect.

According to a sixth aspect, a terminal device is provided, where the terminal device includes a memory and a processor, the memory is configured to store a program, the processor is configured to execute the program, and when executing the program, the processor is configured to perform the method in any one of the second aspect and the implementations of the second aspect.

According to a seventh aspect, a computer-readable storage medium is provided, where the computer-readable storage medium is configured to store program code, and when the program code is executed by a computer, the computer is configured to perform the method in any one of the first aspect and the implementations of the first aspect.

According to an eighth aspect, a computer-readable storage medium is provided, where the computer-readable storage medium is configured to store program code, and when the program code is executed by a computer, the computer is configured to perform the method in any one of the second aspect and the implementations of the second aspect.

Optionally, in the seventh aspect and the eighth aspect, the computer-readable storage medium may be located inside a terminal device, and the program code stored in the computer-readable medium may be executed by the terminal device. When the program code is executed by the terminal device, the terminal device can perform the method in any one of the first aspect and the implementations of the first aspect or the method in any one of the second aspect and the implementations of the second aspect.

According to a ninth aspect, a chip is provided, where the chip includes a processor, and the processor is configured to perform the method in any one of the first aspect and the implementations of the first aspect.

According to a tenth aspect, a chip is provided, where the chip includes a processor, and the processor is configured to perform the method in any one of the second aspect and the implementations of the second aspect.

According to an eleventh aspect, a computer program (or referred to as a computer program product) used to enable a computer or a terminal device to perform the method in any one of the first aspect and the implementations of the first aspect is provided.

According to a twelfth aspect, a computer program (or referred to as a computer program product) used to enable a computer or a terminal device to perform the method in any one of the second aspect and the implementations of the second aspect is provided.

DESCRIPTION OF EMBODIMENTS

The following describes technical solutions of this application with reference to accompanying drawings.

In a conventional solution, a terminal device mainly determines a corresponding resource scheduling manner based on a load status of a current task, and then schedules a resource in the resource scheduling manner. In this manner, how to perform scheduling is mainly determined based on the load status of the current task. No user experience is perceived in this scheduling manner. Although execution of a corresponding task can be completed in a scheduling process, user experience may not necessarily be relatively good.

For a terminal device, whether user experience is good or poor is obviously related to a display speed of an image frame. When the display speed of the image frame is relatively low, a user feels frame freezing, and user experience is poor, while when the display speed of the image frame is relatively high, the user feels that an image is relatively smooth, and user experience is relatively good. For example, the user is playing a game. If the display speed of the image frame is relatively high, the user feels that the game is very smooth. On the contrary, the user feels that frame freezing occurs in the game.

It is found through analysis that there is an obvious correspondence between the display speed of the image frame and execution of a frame drawing thread. When the frame drawing thread is executed relatively quickly, the image frame is displayed relatively quickly, or when the frame drawing thread is executed relatively slowly, the image frame is displayed relatively slowly. Therefore, for fine resource scheduling, a resource may be directly scheduled for the frame drawing thread such that a resource is scheduled more properly.

Figure 1:
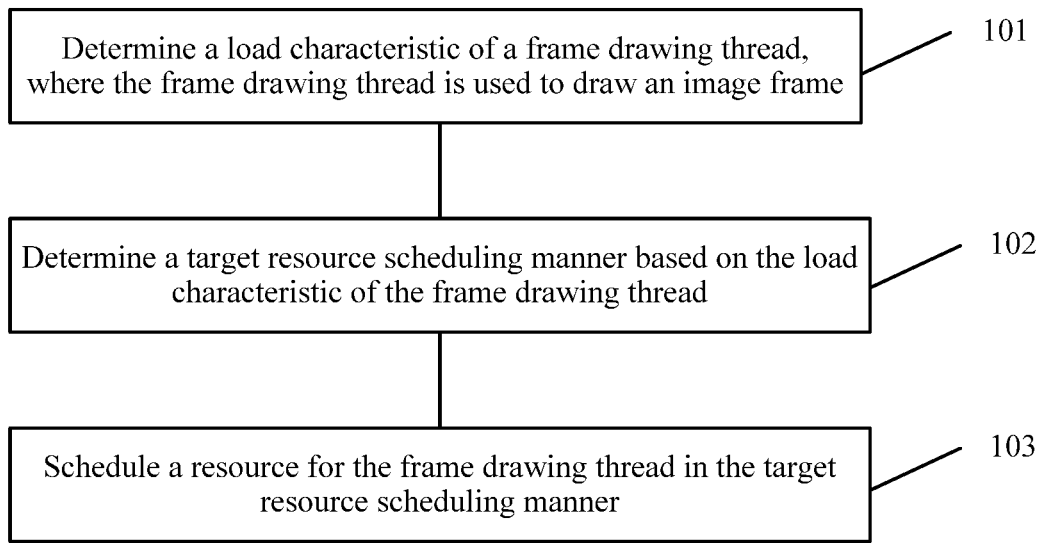
FIG. 1 is a schematic flowchart of a resource scheduling method according to an embodiment of this application.

The following describes in detail a resource scheduling method in the embodiments of this application with reference to FIG. 1. It should be understood that a resource scheduled in this application may be a computing resource (for example, a CPU) or a storage resource (for example, storage space).

FIG. 1 is a schematic flowchart of a resource scheduling method according to an embodiment of this application. The method shown in FIG. 1 may be performed by a terminal device. The terminal device herein may be a mobile terminal (for example, a smartphone), a computer, a personal digital assistant, a wearable device, a vehicle-mounted device, an internet of things device, or the like.

The method shown in FIG. 1 includes step 101 to step 103. The following describes the steps in detail.

101. Determine a load characteristic of a frame drawing thread, where the frame drawing thread is used to draw an image frame.

The image frame may also be referred to as a frame of an image. For brevity, the image frame and the frame of the image are collectively referred to as an image frame in this specification.

An execution speed of the frame drawing thread may affect user experience. For example, when the execution speed of the frame drawing thread is relatively low, it takes a relatively long time to draw the image frame, and a user may feel that frame freezing occurs in an image, or when the execution speed of the frame drawing thread is relatively high, drawing of the image frame may be completed within a relatively short time, and a user feels that the image is relatively smooth.

The load characteristic of the frame drawing thread can reflect some load features of the frame drawing thread. For example, the load characteristic of the frame drawing thread can reflect whether the frame drawing thread is computing-intensive (requiring for more computing resources) or access-intensive (requiring for more storage resources). The load characteristic of the frame drawing thread can further reflect a latency feature (a low latency or a high latency) of the frame drawing thread.

Optionally, the frame drawing thread may be determined before step 101.

Further, a thread for calling a key frame drawing function in a process of drawing the image frame may be determined as the frame drawing thread. For example, when the key frame drawing function is called, the thread for calling the key frame drawing function is determined in the key frame drawing function, and the thread for calling the key frame drawing function is the frame drawing thread.

The key frame drawing function may be some key functions in the process of drawing the image frame, and the key frame drawing function may be preset. Further, the key frame drawing function may be determined based on a type of an operating system used by the terminal device, and key frame drawing functions corresponding to different types of operating systems may be different. For example, a key frame drawing function corresponding to an IOS system is different from a key frame drawing function corresponding to an ANDROID system.

Figure 2:
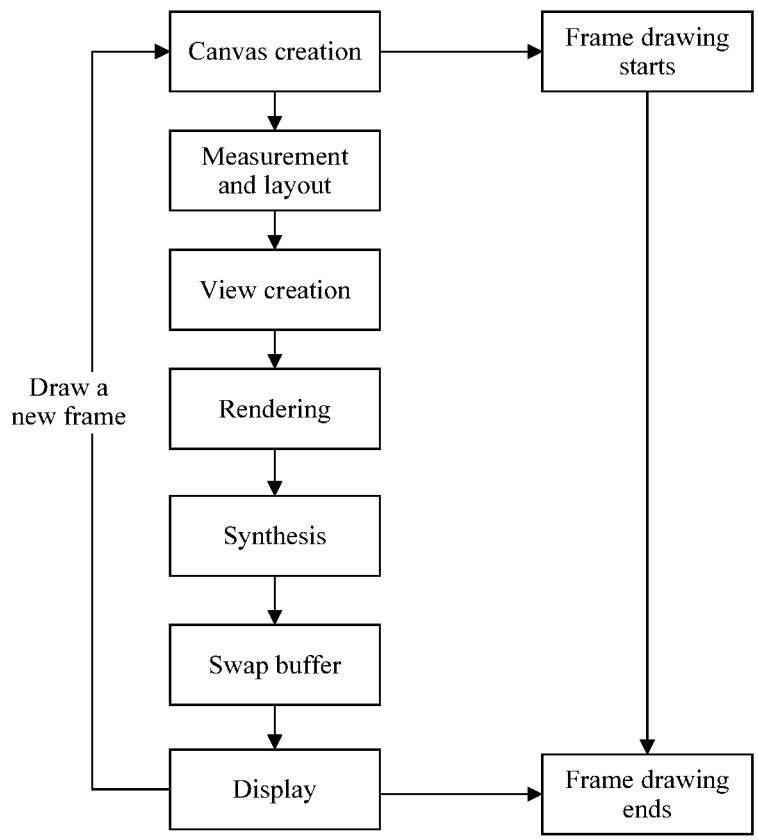
FIG. 2 is a schematic diagram of a process of determining a frame drawing thread.

The following describes in detail a process of determining a frame drawing thread in the ANDROID system with reference to FIG. 2.

FIG. 2 shows a process of drawing a frame of image. The process includes canvas creation, measurement and layout, view creation, rendering, synthesis, swap buffer, and display.

The process of canvas creation to display may be considered as a series of steps for drawing an image frame after a key frame drawing function is called. In each process, a key frame drawing function is called using a corresponding thread (different steps or processes may be performed by a same thread or different threads). Therefore, threads run in these processes may be determined as frame drawing threads.

It should be understood that because a display process is mainly related to hardware performance, and is little related to resource scheduling, a thread for calling a key frame drawing function in the process of canvas creation to swap buffer in FIG. 2 may be determined as a frame drawing thread.

In step 101, the load characteristic of the frame drawing thread may be determined by recording performance indicator data of the frame drawing thread.

Optionally, the load characteristic of the frame drawing thread is used to indicate a resource requirement feature of the frame drawing thread.

Further, the resource requirement feature of the frame drawing thread may indicate whether load of the frame drawing thread is computing-intensive or resource-intensive such that a corresponding target resource scheduling manner is subsequently determined.

Optionally, the load characteristic of the frame drawing thread may be used to indicate at least one of a resource requirement feature of the frame drawing thread, a latency feature of the frame drawing thread, and a running feature of the frame drawing thread.

The load characteristic of the frame drawing thread can reflect an overall load characteristic of the frame drawing thread such that a resource is subsequently scheduled based on the load characteristic of the frame drawing thread.

Optionally, in an embodiment, the load characteristic of the frame drawing thread is determined based on at least one of an average quantity of CPI, a quantity of branch instructions, and a cache miss rate of the frame drawing thread in a first time interval, and the first time interval is a period of time between start of execution of the frame drawing thread and end of the execution of the frame drawing thread.

The average quantity of CPI indicates a clock cycle required for executing each computer instruction (which may also be referred to as an average quantity of cycles of the instruction). The average quantity of CPI may be calculated based on a formula $X=Y/Z$, where Y indicates a quantity of clock cycles in a period of time, Z indicates a quantity of instructions in the period of time, and X is the average quantity of CPI. The quantity of branch instructions is used to indicate a quantity of branches (a branch is a program), where the quantity of branches may also be considered as a quantity of jump instructions, and one jump instruction indicates one branch.

When the load characteristic of the frame drawing thread is being determined, performance indicator data of the frame drawing thread in a period of time may be first collected, and then the load characteristic of the frame drawing thread is determined based on the performance indicator data of the frame drawing thread in the period of time.

Optionally, in an embodiment, determining the load characteristic of the frame drawing thread includes recording at least one of an average quantity of CPI, a quantity of branch instructions, and a cache miss rate of the frame drawing thread in a first time interval, where the first time interval is a period of time between start of execution of the frame drawing thread and end of the execution of the frame drawing thread, and determining the load characteristic of the frame drawing thread based on the at least one of the average quantity of CPI, the quantity of branch instructions, and the cache miss rate of the frame drawing thread in the first time interval.

Setting of the first time interval may be determined based on performance indicator data that can be collected, and the first time interval may be set to a time required for collecting sufficient performance indicator data. In addition, a proportion threshold may be set for the first time interval when the first time interval is being set, and a proportion of the first time interval to a drawing time of the image frame cannot exceed the proportion threshold (after the proportion exceeds the proportion thread, the execution of the frame drawing thread of the image frame is to be completed soon, and in this case, there is no sense in scheduling a resource for the image frame).

A program counter may record an address of an instruction that is being executed for the image frame, and a program counter of the frame drawing thread in the first time interval may be an address of an instruction that is executed for the image frame in the first time interval.

Optionally, when the load characteristic of the frame drawing thread is being determined, the performance indicator data of the frame drawing thread in the first time interval may be directly determined as the load characteristic of the frame drawing thread, or analysis or processing may be first performed on the performance indicator data of the frame drawing thread in the first time interval, and data or a parameter obtained through the analysis or the processing (the data or the parameter obtained through the processing may be data or a parameter reflecting an overall load feature of the image frame) is used as the load characteristic of the frame drawing thread.

For example, when two types of performance indicator data of the frame drawing thread are collected in the first time interval, division may be performed on the two types of performance indicator data (for example, division processing may be performed on the average quantity of CPI of the frame drawing thread in the first time interval and the quantity of branch instructions of the frame drawing thread in the first time interval), and an obtained value is used to indicate the load characteristic of the frame drawing thread.

In addition, when some performance indicator data in the first time interval is collected, a hash operation may be performed on the performance indicator data (for example, a hash operation may be performed on the address that is of the instruction executed for the image frame and that is collected by the program counter), and then information or a parameter obtained through the operation is used to indicate the load characteristic of the frame drawing thread.

It should be understood that the performance indicator data of the frame drawing thread may be collected a plurality of times in the first time interval, and then the load characteristic of the frame drawing thread is comprehensively determined based on the various performance indicator data collected a plurality of times such that the load characteristic of the frame drawing thread can be determined more accurately. Generally, a larger quantity of times of collecting the performance indicator data of the frame drawing thread and a higher frequency of collecting the performance indicator data indicate higher accuracy of the determined load characteristic of the frame drawing thread and relatively high overheads. Therefore, in actual application, a length of the first time interval and the frequency of collecting the performance indicator data may be determined based on experience or a simulation result.

The following describes in detail a specific representation form of performance indicator data of frame drawing threads with reference to Table 1. Table 1 shows specific values of collected average quantities of CPI, collected quantities of branch instructions, collected cache miss rates, and collected program counters of a frame drawing thread 0 and a frame drawing thread 1. The frame drawing thread 0 is used as an example. Specific values of average quantities of CPI of the frame drawing thread 0 that are collected in a period of time are 0.7, 0.72, 0.6, 0.8, and the like, quantities of branch instructions (in 1000s (k)) of the frame drawing thread 0 that are collected in the period of time are 98k, 87k, 102k, and the like, cache miss rates of the frame drawing thread 0 that are collected in the period of time are 0.008, 0.002, 0.01, and the like, and program counters of the frame drawing thread 0 that are collected in the period of time are 0xe8dab47a, 0xe8dac79b, and the like. It should be understood that Table 1 shows only a specific representation form of the load characteristic of the frame drawing thread (values of various parameters in Table 1 are also specific examples). Actually, the load characteristic of the frame drawing thread may include at least one of the parameters in Table 1, or may include another parameter that can reflect performance of the frame drawing thread.

TABLE 1

| Frame drawing thread | Average quantity of CPI | Quantity of branch instructions | Cache miss rate | Program counter |
|---|---|---|---|---|
| Frame drawing thread 0 | {0.7, 0.72, 0.6, 0.8 . . .} | {98k, 87k, 102k . . .} | {0.008, 0.002, 0.01 . . .} | {0xe8dab47a, 0xe8dac79b . . .} |
| Frame drawing thread 1 | {1.51, 1.72, 1.36, 1.48 . . .} | {121k, 126k, 133k . . .} | {0.036, 0.041, 0.039 . . .} | . . . |
| . . . | . . . | . . . | . . . | . . . |

102. Determine a target resource scheduling manner based on the load characteristic of the frame drawing thread.

103. Schedule a resource for the frame drawing thread in the target resource scheduling manner.

For a computing-intensive frame drawing thread, scheduling more computing resources may be considered when a target resource scheduling manner is being determined. For a memory-intensive frame drawing thread, scheduling more storage resources may be considered when a target resource scheduling manner is being determined. For a frame drawing thread with a low latency requirement, more resources may be scheduled when a target resource scheduling manner is being determined, to accelerate execution of the frame drawing thread. For a frame drawing thread with a high latency requirement, an appropriate resource may be scheduled when a target resource scheduling manner is being determined (because the frame drawing thread belongs to a high-latency service, there is no need to schedule excessive resources to execute the thread).

In this application, because the frame drawing thread is a thread for drawing an image frame, and the execution speed of the frame drawing thread is directly related to user experience, performing scheduling for the frame drawing thread in the target resource scheduling manner determined using the load characteristic of the frame drawing thread can implement finer-granularity resource scheduling such that resource scheduling is more specific and a resource scheduling effect is better.

Optionally, after the load characteristic of the frame drawing thread is obtained based on the performance indicator data of the frame drawing thread, it may be first determined whether historical record information includes the load characteristic. If the historical record information does not include the load characteristic, a load value of the frame drawing thread continues to be obtained, and the load characteristic and the load value of the frame drawing thread are recorded. If the historical record information includes the load characteristic, it indicates that a load value of the frame drawing thread may be recorded, and in this case, only the load characteristic of the frame drawing thread needs to be recorded (the load characteristic of the frame drawing thread may be recorded to subsequently determine the target resource scheduling manner).

Figure 3:
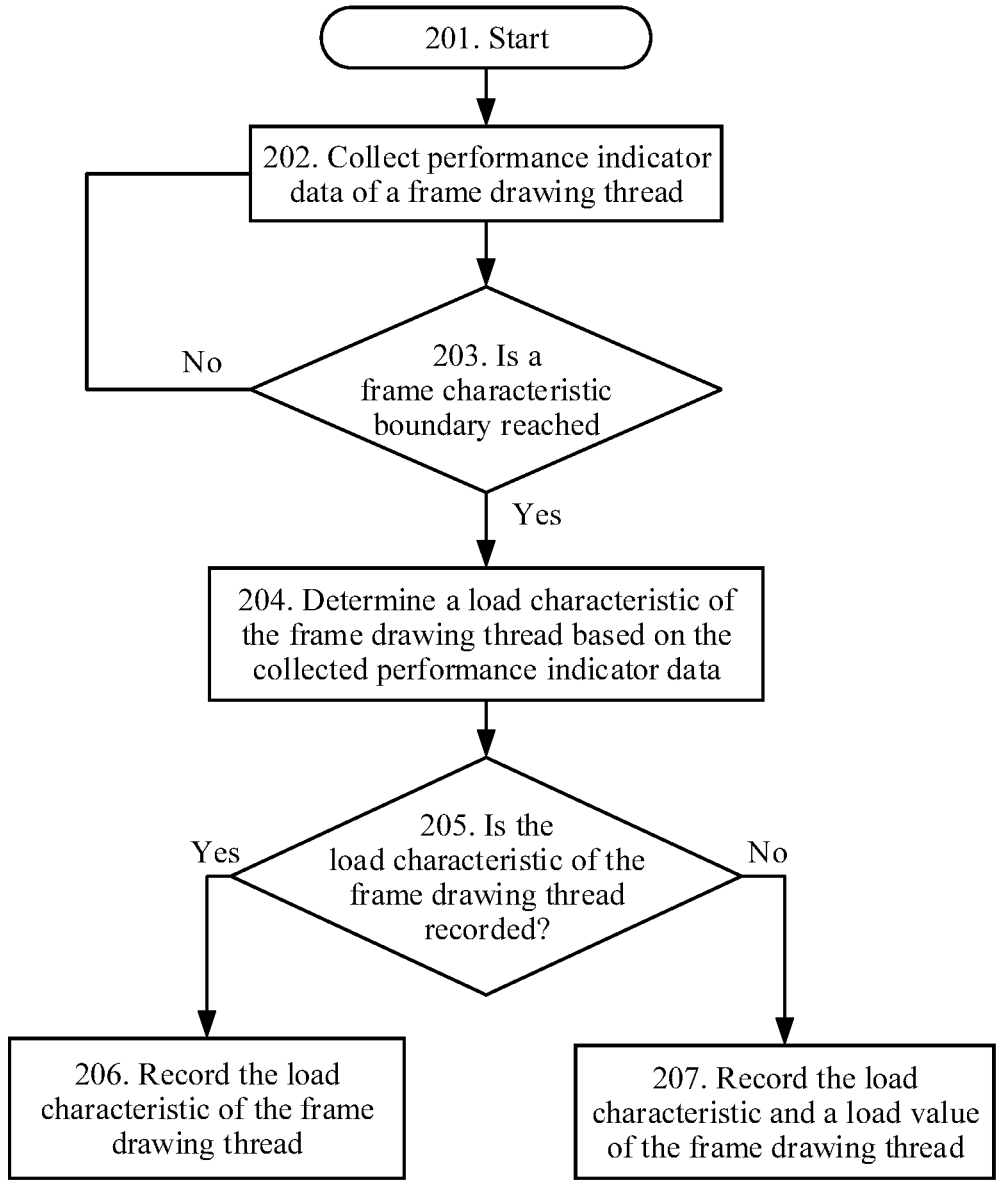
FIG. 3 is a schematic flowchart of obtaining a load characteristic of a frame drawing thread based on performance indicator data of the frame drawing thread.

FIG. 3 is a schematic flowchart of obtaining a load characteristic of a frame drawing thread based on performance indicator data of the frame drawing thread. A process shown in FIG. 3 includes step 201 to step 207. The following describes step 201 to step 207 in detail.

201. Start.

Step 201 indicates starting to collect the performance indicator data of the frame drawing thread, and a start time of step 201 may be a time at which the frame drawing thread starts to be executed.

202. Collect the performance indicator data of the frame drawing thread.

The performance indicator data may be at least one of an average quantity of CPI, a quantity of branch instructions, a cache miss rate, and a program counter of the frame drawing thread in a period of time (which may be a foregoing first time interval).

203. Determine whether a frame characteristic boundary of an image frame is reached.

The frame characteristic boundary may be a period of time. The performance indicator data of the frame drawing thread is collected in the period of time. After the period of time expires, collection of the performance indicator data of the frame drawing thread is stopped. Further, the frame characteristic boundary may be the first time interval in the foregoing description.

204. Determine the load characteristic of the frame drawing thread based on the collected performance indicator data.

It should be understood that for a specific manner and process of determining the load characteristic of the frame drawing thread in step 204, reference may be made to a specific manner and process of determining the load characteristic of the frame drawing thread in related paragraphs in step 101 to step 103 in the foregoing description.

205. Determine whether the load characteristic of the frame drawing thread is a recorded load characteristic.

It should be understood that the recorded load characteristic may be a load characteristic that is of a frame preceding the image frame and that is recorded by a terminal device, and the recorded load characteristic may include only different load characteristics.

206. Record the load characteristic of the frame drawing thread.

The load characteristic of the frame drawing thread is mainly recorded in step 206 to subsequently determine a target resource scheduling manner.

207. Record the load characteristic and a load value of the frame drawing thread.

In step 207, a predicted load value of the frame drawing thread may be determined based on the load characteristic of the frame drawing thread (for details, refer to related content of determining the predicted load value of the frame drawing thread based on the load characteristic of the frame drawing thread in this specification), the predicted load value of the frame drawing thread is used as the load value of the frame drawing thread, and then the load characteristic and the load value of the frame drawing thread are recorded such that subsequently, the load value is directly determined based on a recorded correspondence between a load characteristic and a load value.

In this application, when the target resource scheduling manner is being determined based on the load characteristic of the frame drawing thread, the resource scheduling manner may be determined based on a specific characteristic of load of the frame drawing thread. For example, more resources may be scheduled for the frame drawing thread to increase the execution speed of the frame drawing thread and improve user experience.

In step 102, the target resource scheduling manner is determined based on the load characteristic of the frame drawing thread in a plurality of specific manners. Further, the predicted load value of the frame drawing thread may be first determined based on the load characteristic of the frame drawing thread, and then the target resource scheduling manner is determined through calculation based on the load characteristic of the frame drawing thread, the predicted load value of the frame drawing thread, and a preset target frame rate, or the target resource scheduling manner may be determined based on the load characteristic of the frame drawing thread, the predicted load value of the frame drawing thread, and a preset correspondence (the correspondence herein includes a correspondence between a load characteristic, a load value, and a resource scheduling manner), or the target resource scheduling manner may be directly determined based on the load characteristic of the frame drawing thread and a preset correspondence (the correspondence herein includes a correspondence between a load characteristic and a resource scheduling manner).

Optionally, in an embodiment, determining a target resource scheduling manner based on the load characteristic of the frame drawing thread includes determining a predicted load value of the frame drawing thread based on the load characteristic of the frame drawing thread, and determining the target resource scheduling manner based on the load characteristic of the frame drawing thread, the predicted load value of the frame drawing thread, and a preset target frame rate.

Further, when the target resource scheduling manner is being determined based on the load characteristic of the frame drawing thread, the predicted load value of the frame drawing thread, and the preset target frame rate, a plurality of available resource scheduling manners may be first determined based on the load characteristic of the frame drawing thread, the predicted load value of the frame drawing thread, and the preset target frame rate, and then a resource scheduling manner corresponding to lowest power consumption in the plurality of available resource scheduling manners is determined as the target resource scheduling manner.

In this application, the resource scheduling manner corresponding to the lowest power consumption in the plurality of available resource scheduling manners is determined as the target resource scheduling manner such that power consumption can be reduced as much as possible while a resource scheduling requirement of the frame drawing thread of the image frame is met, thereby implementing a balance between performance and power consumption.

Figure 4:
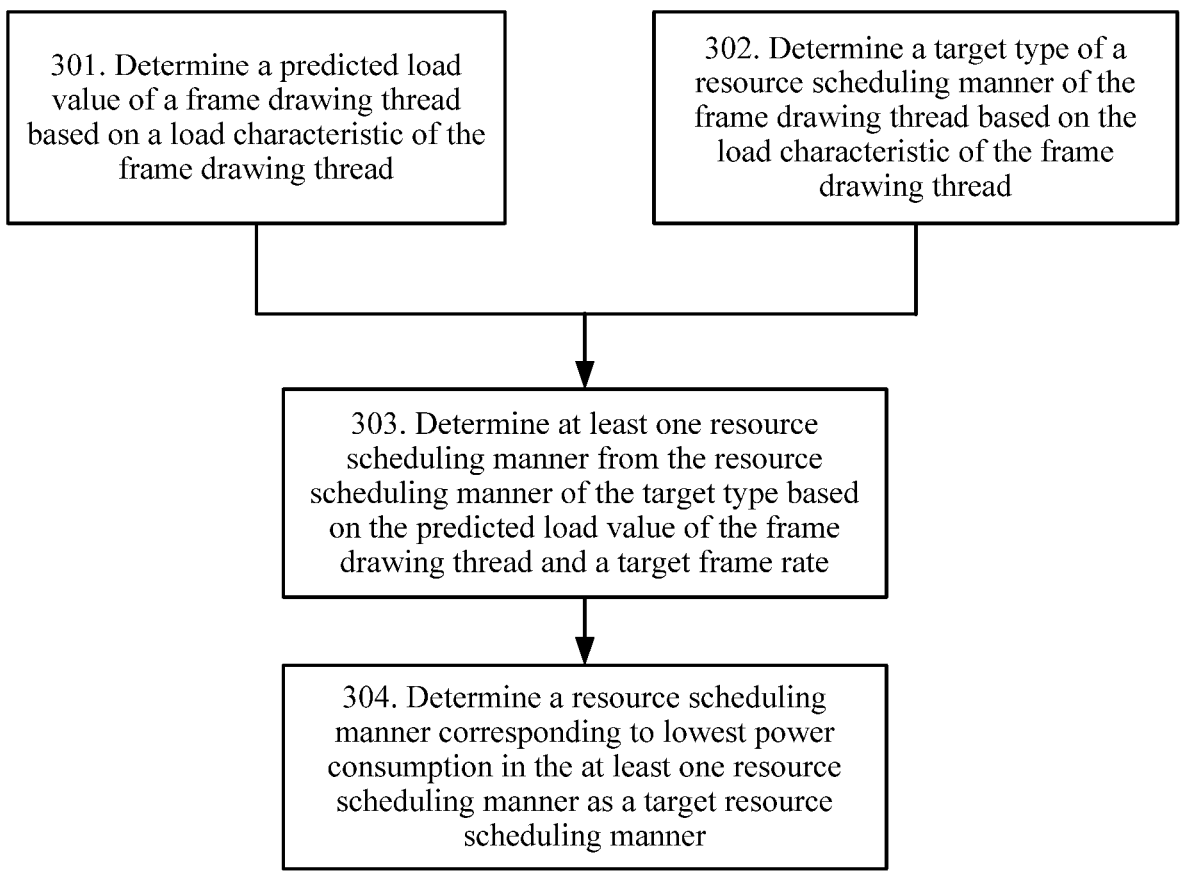
FIG. 4 is a schematic flowchart of a resource scheduling method according to an embodiment of this application.

FIG. 4 is a schematic flowchart of a resource scheduling method according to an embodiment of this application. It should be understood that the method shown in FIG. 4 mainly shows a process of determining a target resource scheduling manner based on a load characteristic of a frame drawing thread. The method shown in FIG. 4 includes step 301 to step 304. The following describes step 301 to step 304 in detail.

301. Determine a predicted load value of the frame drawing thread based on the load characteristic of the frame drawing thread.

302. Determine a target type of a resource scheduling manner of the frame drawing thread based on the load characteristic of the frame drawing thread.

It should be understood that there is no sequence between step 301 and step 302. Step 301 and step 302 may be performed simultaneously or in sequence (step 301 is performed before step 302, or step 302 is performed before step 301).

For different types of load, required resource scheduling manners are also different. In step 302, a type of a resource scheduling manner matching the load characteristic of the frame drawing thread is determined based on the load characteristic of the frame drawing thread.

For example, when load of the frame drawing thread is computing-intensive, the type of the resource scheduling manner matching the frame drawing thread is mainly scheduling a computing resource, or when load of the frame drawing thread is memory-intensive, the type of the resource scheduling manner matching the frame drawing thread is mainly scheduling a storage resource.

303. Determine at least one resource scheduling manner from the resource scheduling manner of the target type based on the predicted load value of the frame drawing thread and a target frame rate.

For example, when the target type is scheduling a computing resource, at least one resource scheduling manner needs to be determined from the type of scheduling a computing resource in step 303.

304. Determine a resource scheduling manner corresponding to lowest power consumption in the at least one resource scheduling manner as the target resource scheduling manner.

In step 304, the resource scheduling manner corresponding to the lowest power consumption in the at least one resource scheduling manner may be determined based on an energy efficiency table or an energy efficiency curve, and then the resource scheduling manner with the lowest power consumption is determined as the target resource scheduling manner.

A specific representation form of the energy efficiency table may be shown in Table 2. In Table 2, a performance value may be used to indicate a processing capability of a processor, and a larger performance value indicates better performance and a higher processing speed of the processor.

Assuming that a program instruction of 100 million (M) is executed in a fixed period of time when a largest core in a CPU executes a program at a highest frequency with 100% load, a performance value of the largest core at the highest frequency may be defined as 1024. However, if a smallest core in the CPU is used to execute the same program at a lowest frequency with 100% load within the same time, and the smallest core executes only an instruction of 10 M in the period of time, it may be considered that a corresponding performance value when the smallest core in the CPU runs at the lowest frequency is 102.4. That is, when the smallest core in the CPU runs at the lowest frequency, the performance value of the smallest core in the CPU is 1/10 of the performance value of the largest core in the CPU when the largest core runs at the highest frequency.

As shown in Table 2, performance of a first resource scheduling manner is 107, a frequency is 533, and power consumption corresponding to the resource scheduling manner is 32. It is assumed that three resource scheduling manners: a resource scheduling manner 1, a resource scheduling manner 2, and a resource scheduling manner 3 are determined in step 303, and specific information of the three resource scheduling manners is as follows.

The resource scheduling manner 1 corresponds to a small core, performance of 306, a frequency of 1042, and power consumption of 119.

The resource scheduling manner 2 corresponds to a small core, performance of 388, a frequency of 1804, and power consumption of 242.

The resource scheduling manner 3 corresponds to a large core, performance of 373, a frequency of 903, and power consumption of 191.

In the three resource scheduling manners, the power consumption corresponding to the resource scheduling manner 1 is lowest, and the resource scheduling manner 1 may be determined as the target resource scheduling manner.

TABLE 2

| Processor type | Performance | Frequency | Power consumption |
|---|---|---|---|
| Small core | 107 | 533 | 32 |
| | 209 | 999 | 69 |
| | 306 | 1402 | 119 |
| | 383 | 1709 | 181 |
| | 388 | 1804 | 242 |
| Large core | 373 | 903 | 191 |
| | 591 | 1421 | 370 |
| | 747 | 1805 | 596 |
| | 878 | 2112 | 876 |
| | 1024 | 2362 | 1214 |

It should be understood that when the target resource scheduling manner is being determined, to simplify a process of determining the target resource scheduling manner and reduce complexity of determining the target resource scheduling manner, the target resource scheduling manner may be directly determined based on load information (the load information may include the load characteristic and a load value) of the frame drawing thread of an image frame and information about a mapping relationship between load information and a resource scheduling manner.

Optionally, in an embodiment, determining a target resource scheduling manner based on the load characteristic of the frame drawing thread includes determining the predicted load value of the frame drawing thread based on the load characteristic of the frame drawing thread, and determining the target resource scheduling manner based on the load characteristic of the frame drawing thread, the predicted load value of the frame drawing thread, and first mapping relationship information, where the first mapping relationship information includes a plurality of pieces of load information and a resource scheduling manner corresponding to each of the plurality of pieces of load information, and each of the plurality of pieces of load information includes one load characteristic and one load value.

Further, determining the target resource scheduling manner based on the load characteristic of the frame drawing thread, the predicted load value of the frame drawing thread, and first mapping relationship information includes determining a resource scheduling manner corresponding to the load characteristic of the frame drawing thread and the predicted load value of the frame drawing thread in the first mapping relationship information as the target resource scheduling manner.

In the process of determining the target resource scheduling manner, a first load characteristic matching the load characteristic of the frame drawing thread and a first load value matching the predicted load value of the frame drawing thread may be determined from the first mapping relationship information, and then a resource scheduling manner corresponding to the first load characteristic and the first load value is determined as the target resource scheduling manner based on the first mapping relationship information.

When the first load characteristic is being determined from the first mapping relationship information, a load characteristic that is in a plurality of load characteristics included in the first mapping relationship and whose similarity to the load characteristic of the frame drawing thread is greater than or equal to a similarity threshold may be determined as the first load characteristic. Similarly, when the first load value is being determined from the first mapping relationship information, a load value that is in a plurality of load values included in the first mapping relationship and whose similarity to the predicted load value of the frame drawing thread is greater than or equal to a similarity threshold may be determined as the first load value.

Optionally, the first mapping relationship may be determined based on historical information recorded by a terminal device, and the historical information includes a load characteristic, a load value, and a corresponding resource scheduling manner of an image frame preceding the image frame.

The first mapping relationship information may be in a form of a table, or may be information of any other form for recording a load characteristic, a load value, and a corresponding resource scheduling manner.

For example, a specific representation form of the first mapping relationship information may be shown in Table 3.

TABLE 3

| Load characteristic | Load value | Resource scheduling manner |
| --- | --- | --- |
| Load characteristic 1 | 500 | Resource scheduling manner 1 |
| Load characteristic 2 | 800 | Resource scheduling manner 2 |
| Load characteristic 3 | 900 | Resource scheduling manner 3 |
| ... | ... | ... |

In Table 3, a specific parameter included in the load characteristic may be at least one of an average quantity of CPI, a quantity of branch instructions, a cache miss rate, and a program counter in Table 1, a specific parameter included in the resource scheduling manner may be any one of parameters such as a processor type, performance, and a frequency, and the load value may be determined based on a thread running frequency and time. The load value may indicate a quantity of tasks that need to be executed by a frame drawing thread. A larger load value indicates a larger quantity of program instructions that need to be executed by the frame drawing thread.

As shown in Table 3, when the load characteristic of the frame drawing thread matches the load characteristic 1 in Table 3, and the load value of the frame drawing thread matches the load value 1 in Table 3, the resource scheduling manner 1 corresponding to the load characteristic 1 and the load value 1 may be determined as the target resource scheduling manner according to Table 3.

In this application, determining the target resource scheduling manner based on the load characteristic and the predicted load value of the frame drawing thread and the first mapping relationship information can reduce complexity of determining the target resource scheduling manner compared with determining the target resource scheduling manner through direct calculation.

In this application, when the predicted load value of the frame drawing thread is being determined, the predicted load value of the frame drawing thread may be determined based on the load characteristic of the frame drawing thread and a mapping relationship between a load characteristic and a load value.

Optionally, in an embodiment, determining a predicted load value of the frame drawing thread based on the load characteristic of the frame drawing thread includes determining a load value corresponding to the load characteristic of the frame drawing thread as the predicted load value of the frame drawing thread based on the load characteristic of the frame drawing thread and second mapping relationship information, where the second mapping relationship information includes a plurality of load characteristics and load values corresponding to each of the plurality of load characteristics.

The second mapping relationship information may be determined based on historical information recorded by the terminal device, and the historical information includes a load characteristic and a corresponding load value of an image frame preceding the image frame.

The second mapping relationship information may be in a form of a table, or may be information of any other form for recording a load characteristic and a corresponding load value.

The predicted load value of the frame drawing thread can be determined relatively conveniently using the load characteristic of the frame drawing thread and the second mapping relationship, and this is simpler than directly determining the predicted load value of the frame drawing thread by analyzing or calculating the load value of the frame drawing thread based on the load characteristic of the frame drawing thread.

A specific form of the second mapping relationship may be shown in Table 4, where ID indicates a frame number, each frame corresponds to one frame characteristic, and each frame characteristic corresponds to one load value. A frame characteristic and load of the frame preceding the image frame may be recorded in Table 4. Therefore, Table 4 may be generated from at least some historical information (including a frame and a frame characteristic and load corresponding to the frame) recorded by the terminal device.

TABLE 4

| ID | Frame characteristic | Load |
| --- | --- | --- |
| 1 | Quantity of branch instructions {98k, 87k, 102k . . .}/ Cache miss rate {0.008, 0.002, 0.01 . . .}/. . . | 100 |
| 2 | Quantity of branch instructions {121k, 126k, 133k . . .}/ Cache miss rate {0.036, 0.041, 0.039 . . .}/. . . | 800 |
| . . . | . . . | . . . |

It should be understood that the frame characteristic in Table 4 is described merely using the quantity of branch instructions and the cache miss rate as examples. The frame characteristic may be indicated using another parameter that can reflect a frame feature.

The predicted load value of the frame drawing thread may be determined based on the load characteristic of the frame drawing thread and the second mapping relationship information in the following two cases:

(1) When the plurality of load characteristics in the second mapping relationship information include a reference load characteristic whose similarity to the load characteristic of the frame drawing thread reaches a preset similarity, a load value corresponding to the reference load characteristic is determined as the predicted load value of the frame drawing thread.

(2) When the plurality of load characteristics does not include the reference load characteristic, a load value of a frame preceding the image frame is determined as the predicted load value of the frame drawing thread.

That a similarity to the load characteristic of the frame drawing thread reaches the preset similarity may mean that the similarity to the load characteristic of the frame drawing thread is greater than or equal to a similarity threshold.

It should be understood that the reference load characteristic may be one load characteristic (the second mapping relationship information includes only one load characteristic whose similarity to the load characteristic of the frame drawing thread is greater than or equal to the similarity threshold), or may be a plurality of load characteristics (the second mapping relationship information includes a plurality of load characteristics whose similarities to the load characteristic of the frame drawing thread are greater than or equal to the similarity threshold). When the reference load characteristic is one load characteristic, a load value corresponding to the reference load characteristic may be directly determined as the predicted load value of the frame drawing thread. When the reference load characteristic is a plurality of load characteristics, a load value corresponding to any one of the load characteristics may be determined as the predicted load value of the frame drawing thread, or a load value corresponding to a load characteristic whose similarity to the load characteristic of the frame drawing thread is highest may be determined as the target resource scheduling manner.

It should be understood that the frame preceding the image frame may be an image frame displayed before the image frame, and further, the frame preceding the image frame may be an image frame that is displayed before the image frame and that is adjacent to the image frame.

Load values of frame drawing threads of adjacent frames usually do not differ greatly. Therefore, when the plurality of load characteristics do not include a reference load characteristic whose similarity to the load characteristic of the current frame drawing thread meets a requirement, a load value of the frame preceding the image frame may be directly determined as the predicted load value of the frame drawing thread. To further reduce complexity or a calculation amount of determining the target resource scheduling manner, the target scheduling manner may be directly determined based on the load characteristic of the frame drawing thread of the image frame and a mapping relationship between a load characteristic and a resource scheduling manner.

Figure 5:
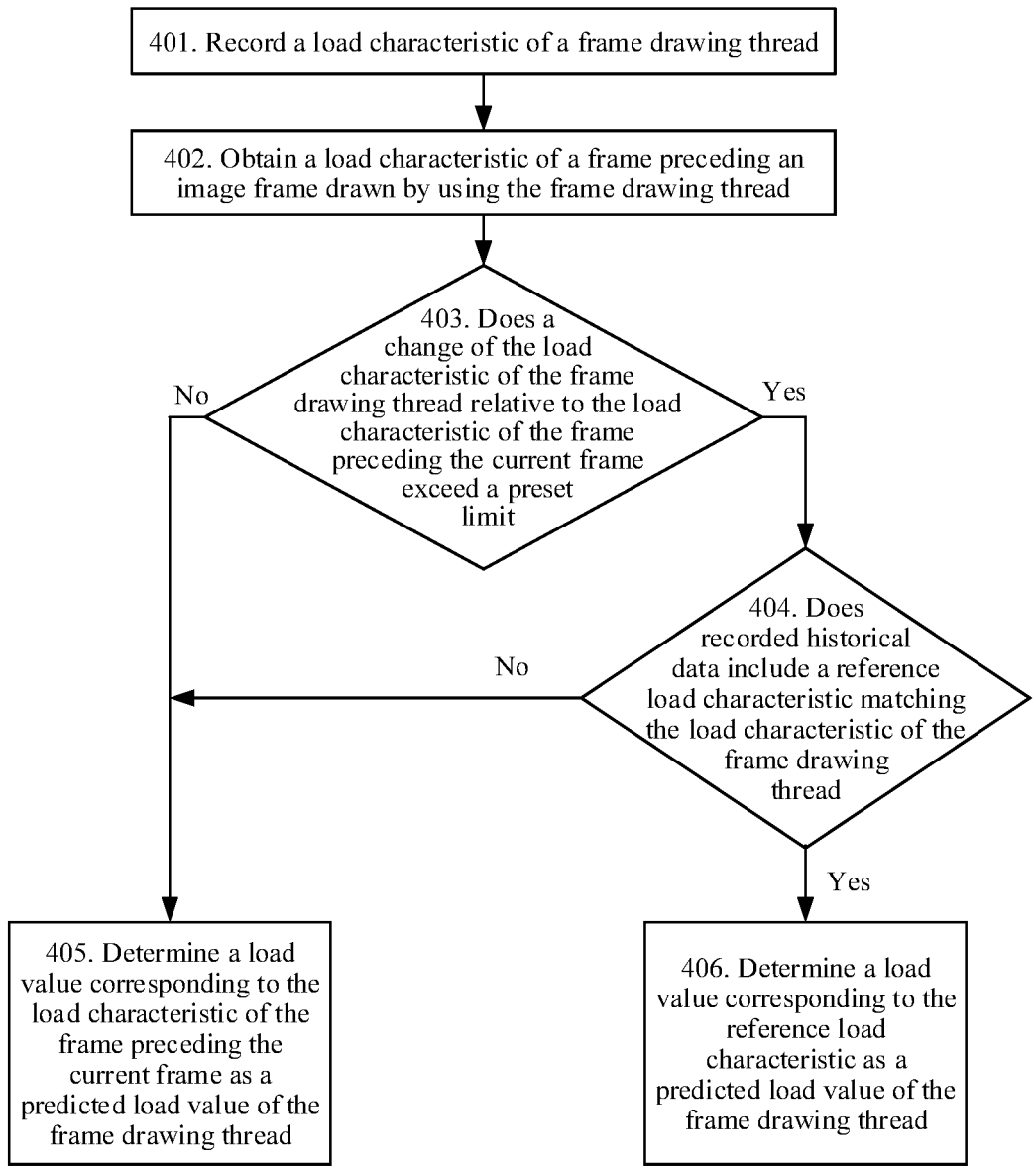
FIG. 5 is a schematic flowchart of determining a predicted load value of a frame drawing thread based on a load characteristic of the frame drawing thread.

FIG. 5 is a schematic flowchart of determining a predicted load value of a frame drawing thread based on a load characteristic of the frame drawing thread. A process shown in FIG. 5 includes step 401 to step 406. The following describes the steps in detail.

401. Record the load characteristic of the frame drawing thread.

402. Obtain a load characteristic of a frame preceding an image frame drawn using the frame drawing thread.

Further, in step 402, the load characteristic of the frame preceding the image frame may be obtained from a recorded load characteristic.

403. Determine whether a change of the load characteristic of the frame drawing thread relative to the load characteristic of the frame preceding the image frame exceeds a preset limit.

It should be understood that in step 403, when the change of the load characteristic of the frame drawing thread relative to the load characteristic of the frame preceding the image frame exceeds the preset limit, it indicates that a difference between the load characteristic of the frame preceding the image frame and the load characteristic of the frame drawing thread is relatively large, and in this case, previously recorded historical data needs to be searched for a reference load characteristic matching the load characteristic of the frame drawing thread, that is, step 404 needs to be performed. When the change of the load characteristic of the frame drawing thread relative to the load characteristic of the frame preceding the image frame does not exceed the preset limit, it indicates that a similarity between the load characteristic of the frame preceding the image frame and the load characteristic of the frame drawing thread is relatively high, and in this case, the load characteristic of the frame preceding the image frame may be directly determined as a reference load characteristic matching the load characteristic of the frame drawing thread, that is, step 406 is performed.

404. Determine whether the recorded historical data includes the reference load feature matching the load characteristic of the frame drawing thread.

In step 404, the reference load characteristic may be a load characteristic whose similarity to the load characteristic of the frame drawing thread is greater than or equal to a similarity threshold.

405. Determine a load value corresponding to the load characteristic of the frame preceding the image frame as a predicted load value of the frame drawing thread.

406. Determine a load value corresponding to the reference load characteristic as a predicted load value of the frame drawing thread.

Optionally, in an embodiment, determining a target resource scheduling manner based on the load characteristic of the frame drawing thread includes determining a resource scheduling manner corresponding to the load characteristic of the frame drawing thread as the target resource scheduling manner based on the load characteristic of the frame drawing thread and third mapping relationship information, where the third mapping relationship information includes a plurality of load characteristics and a resource scheduling manner corresponding to each of the plurality of load characteristics.

The third mapping relationship information may be determined based on historical information recorded by a terminal device (the historical information includes a load characteristic and a corresponding resource scheduling manner of a frame displayed before the image frame).

The third mapping relationship information may be in a form of a table, or may be information of any other form for recording a load characteristic and a corresponding resource scheduling manner.

In this application, the target resource scheduling manner is directly determined using the load characteristic of the frame drawing thread and information about a mapping relationship between a load characteristic and a resource scheduling manner such that a process of determining the predicted load value of the image frame based on the frame drawing thread of the image frame can be omitted, and complexity of determining the target resource scheduling manner can be further reduced.

When the target resource scheduling manner is being determined based on the load characteristic of the frame drawing thread and the third mapping relationship information, a load characteristic relatively similar to the load characteristic of the frame drawing thread may be selected from the third mapping relationship information, and then a resource scheduling manner corresponding to the similar load characteristic is determined as the target resource scheduling manner.

Further, determining the target resource scheduling manner based on the load characteristic of the frame drawing thread and third mapping relationship information includes when the plurality of load characteristics in the third mapping relationship information include a reference load characteristic, determining a resource scheduling manner corresponding to the reference load characteristic as the target resource scheduling manner, where a similarity between the reference load characteristic and the load characteristic of the frame drawing thread is greater than or equal to a similarity threshold, or when the plurality of load characteristics in the third mapping relationship information do not include the reference load characteristic, determining a resource scheduling manner of a frame drawing thread of the frame preceding the image frame as the target resource scheduling manner.

It should be understood that the reference load characteristic may be one load characteristic (the third mapping relationship information includes only one load characteristic whose similarity to the load characteristic of the frame drawing thread is greater than or equal to the similarity threshold), or may be a plurality of load characteristics (the third mapping relationship information includes a plurality of load characteristics whose similarities to the load characteristic of the frame drawing thread are greater than or equal to the similarity threshold). When the reference load characteristic is one load characteristic, a resource scheduling manner corresponding to the reference load characteristic may be directly determined as the target resource scheduling manner. When the reference load characteristic is a plurality of load characteristics, a resource scheduling manner corresponding to any one of the load characteristics may be determined as the target resource scheduling manner, or a resource scheduling manner corresponding to a load characteristic that is in the load characteristics and whose similarity to the load characteristic of the frame drawing thread is highest may be determined as the target resource scheduling manner.

For example, the third mapping relationship may be shown in Table 5. Table 5 records different load characteristics and resource scheduling manners recorded in these different load characteristics. When a similarity between the load characteristic of the frame drawing thread and a load characteristic 1 in Table 5 is greater than or equal to the similarity threshold, a resource scheduling manner 1 corresponding to the load characteristic 1 may be determined as the target resource scheduling manner.

TABLE 5

| Load characteristic | Resource scheduling manner |
| --- | --- |
| Load characteristic 1 | Resource scheduling manner 1 |
| Load characteristic 2 | Resource scheduling manner 2 |
| Load characteristic 3 | Resource scheduling manner 3 |
| . . . | . . . |

Figure 6:
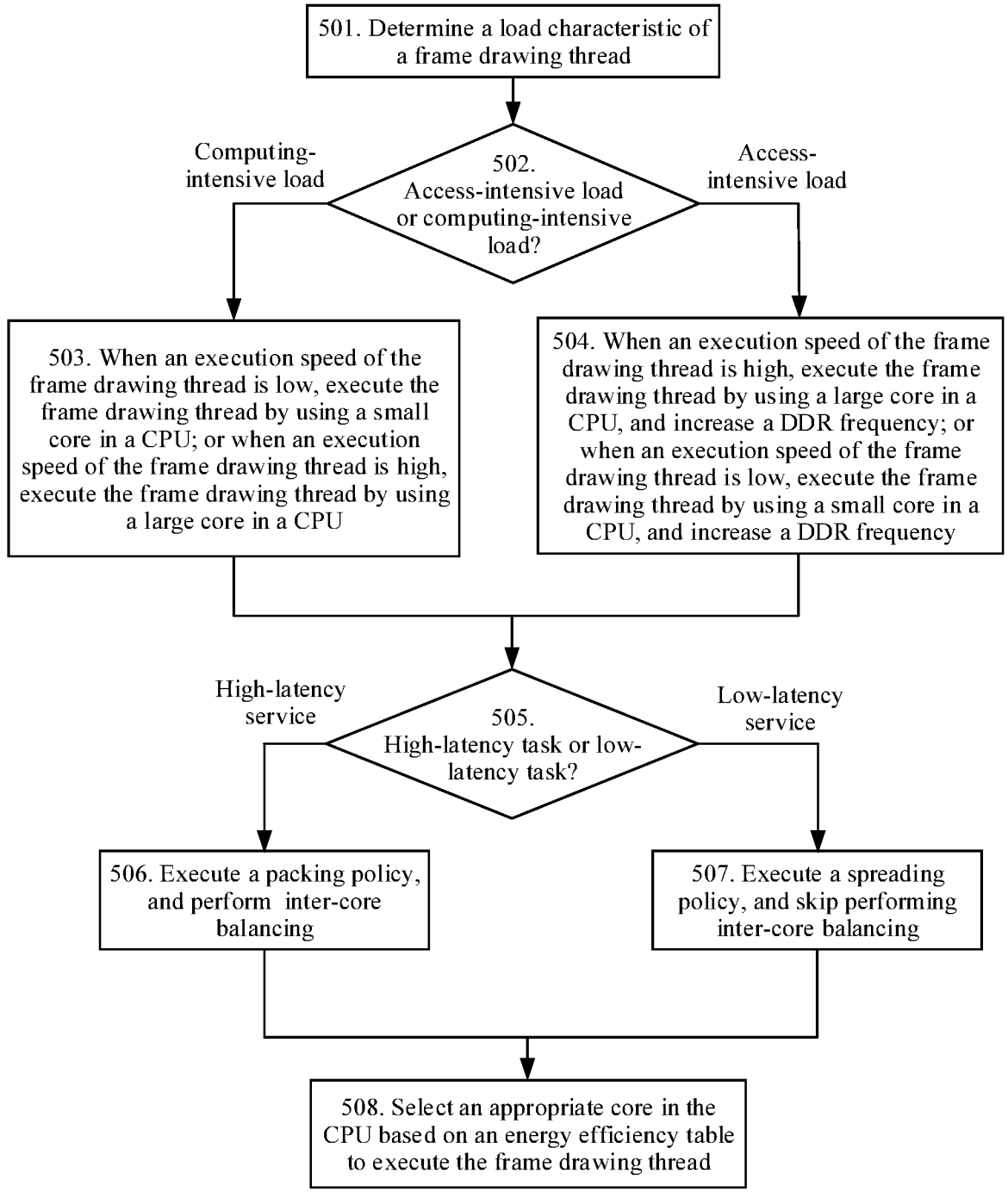
FIG. 6 is a schematic flowchart of scheduling a resource for a frame drawing thread based on a load characteristic of the frame drawing thread.

FIG. 6 is a schematic flowchart of scheduling a resource for a frame drawing thread based on a load characteristic of the frame drawing thread. A process shown in FIG. 6 includes step 501 to step 508. The following describes step 501 to step 508 in detail.

501. Determine the load characteristic of the frame drawing thread.

502. Determine, based on the load characteristic of the frame drawing thread, whether load of the frame drawing thread is access-intensive load or computing-intensive load.

Step 503 is performed if the load of the frame drawing thread is computing-intensive load, or step 504 is performed if the load of the frame drawing thread is access-intensive load.

503. When an execution speed of the frame drawing thread is low, execute the frame drawing thread by scheduling a small core in a CPU, or when an execution speed of the frame drawing thread is high, execute the frame drawing thread using a large core in a CPU.

504. When an execution speed of the frame drawing thread is high, execute the frame drawing thread using a large core in a CPU, and increase a DDR frequency, or when an execution speed of the frame drawing thread is low, execute the frame drawing thread using a small core in a CPU, and increase a DDR frequency.

505. Determine whether the frame drawing thread belongs to a high-latency task or a low-latency task.

506. Execute a packing policy, and perform inter-core balancing.

The packing policy may be that a current task is allocated to a plurality of different CPUs for execution, and the performing inter-core balancing may be that the current task is allocated to a plurality of cores in the CPU for execution.

507. Execute a spreading policy, and skip performing inter-core balancing.

The spreading policy may be that a current task is allocated to one CPU for execution, and the skipping performing inter-core balancing may be that the current task is allocated to a core in the CPU for execution.

508. Select an appropriate core in the CPU based on an energy efficiency table to execute the frame drawing thread.

It should be understood that FIG. 6 mainly shows a process of selecting a corresponding resource scheduling manner based on the load characteristic of the frame drawing thread to schedule the frame drawing thread. Step 501 to step 507 are equivalent to determining a target resource scheduling manner based on the frame drawing thread, and step 508 is equivalent to scheduling a resource for the frame drawing thread in the target resource scheduling manner in the foregoing description.

In addition to using the target resource scheduling manner matching the frame drawing thread to schedule a resource for the frame drawing thread, an association thread that may affect execution of the frame drawing thread may be found, and resources are scheduled for the association threads to increase an execution speed of the association threads such that the execution speed of the frame drawing thread is increased.

Optionally, in an embodiment, the method shown in FIG. 1 further includes determining an association thread of the frame drawing thread, where the association thread is a thread capable of causing the frame drawing thread to sleep, and scheduling a resource for the association thread to accelerate execution of the association thread.

Causing the frame drawing thread to sleep may be further causing the frame drawing thread to sleep intermittently, and the sleep herein may also refer to stopping working. It should be understood that the association thread is a thread capable of causing the frame drawing thread to sleep and further reducing the execution speed of the frame drawing thread. By accelerating the execution of the frame drawing thread, the execution speed of the frame drawing thread can be indirectly increased.

In this application, a resource is scheduled for the association thread such that the execution speed of the frame drawing thread can be indirectly increased, and user experience is improved.

Further, a resource is scheduled for the association thread such that the association thread can be executed as soon as possible, a blocking time of the association thread is reduced, and the execution speed of the frame drawing thread is increased.

Optionally, in an embodiment, a thread related to the frame drawing thread is determined from a candidate thread based on a logical relationship and/or a resource correlation relationship between a candidate thread and a frame drawing thread.

Figure 7:
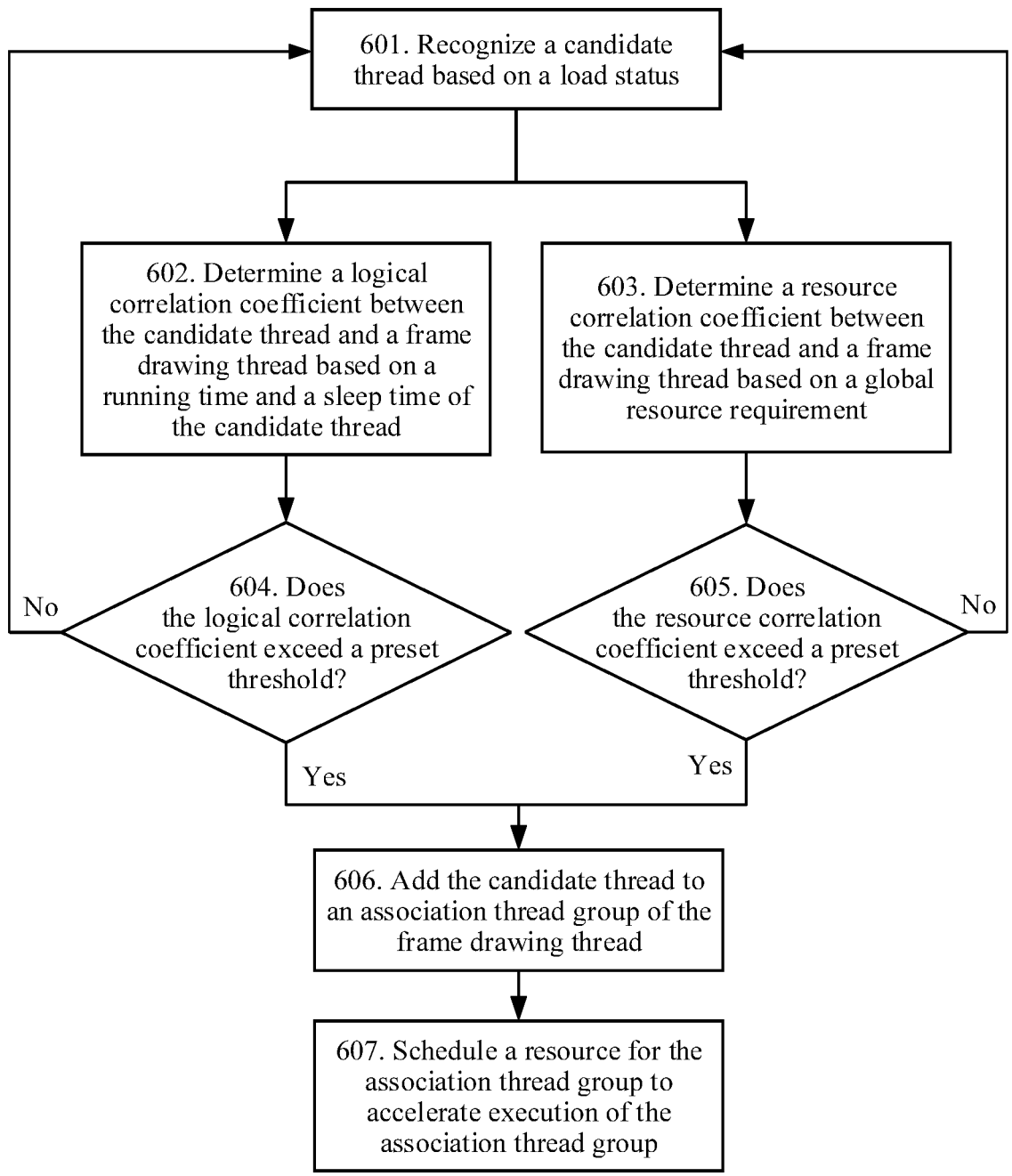
FIG. 7 is a schematic flowchart of determining an association thread and scheduling a resource for the association thread.

FIG. 7 is a schematic flowchart of determining an association thread and scheduling a resource for the association thread. A process shown in FIG. 7 includes step 601 to step 607. The following describes the steps in detail.

601. Recognize a candidate thread based on a load status.

Further, in step 601, a thread with a relatively large load value may be selected, as the candidate thread based on a load value, from threads other than a frame drawing thread in threads currently run on a terminal device. For example, in step 601, 10 threads with maximum load values may be selected, as candidate threads, from other threads.

602. Determine a logical correlation coefficient between the candidate thread and the frame drawing thread based on a running time and a sleep time (or referred to as a sleep time) of the candidate thread.

Further, a logical correlation between the candidate thread and the frame drawing thread may be deduced by comparing running times and sleep times of the candidate thread and the frame drawing thread, and the logical correlation coefficient is obtained. It may be considered that a larger logical correlation coefficient indicates a higher correlation between the candidate thread and the frame drawing thread.

Determining an association thread is described in detail below based on a formula.

For example, the logical correlation coefficient between the candidate thread and the frame drawing thread may be determined based on Formula (1):

$$r(X, Y) = \frac{\text{Cov}(X, Y)}{\sqrt{\text{Var}[X] * \text{Var}[Y]}}. \quad (1)$$

In Formula (1), X is the running time of the frame drawing thread, Y is the running time of the candidate thread, Cov(X, Y) indicates a covariance of X and Y, Var[X] indicates a variance of X, Var[Y] indicates a variance of Y, and r(X, Y) is the logical correlation coefficient between the candidate thread and the frame drawing thread.

603. Determine a resource correlation coefficient between the candidate thread and the frame drawing thread based on a global resource requirement.

Further, when the frame drawing thread sleeps, it may be determined whether the frame drawing thread sleeps due to a lack of a global resource. If the frame drawing thread sleeps due to the lack of the global resource, a thread that is in the candidate thread and to which the global resource currently belongs (a thread to which the global resource is allocated) is further determined. Assuming that the global resource belongs to a first thread, a resource correlation coefficient between the first thread and the frame drawing thread is 1, and a resource correlation coefficient between another thread and the frame drawing thread is 0.

It should be understood that 1 and 0 are used as examples of the resource correlation coefficient herein. Actually, the resource correlation coefficient may be any value between 0 and 1 based on a degree of dependence between another thread and the frame drawing thread.

604. Determine whether the logical correlation coefficient between the candidate thread and the frame drawing thread exceeds a preset threshold.

When the logical correlation coefficient between the candidate thread and the frame drawing thread exceeds the preset threshold (for example, the preset threshold may be 0.8 or 0.9), it may be considered that there is a relatively high correlation between the candidate thread and the frame drawing thread, and the candidate thread may be considered as an association thread of the frame drawing thread. Next, step 606 and step 607 need to be performed.

605. Determine whether the resource correlation coefficient between the candidate thread and the frame drawing thread exceeds a preset threshold.

When the resource correlation coefficient between the candidate thread and the frame drawing thread exceeds the preset threshold, the candidate thread may be considered as an association thread of the frame drawing thread. Next, step 606 and step 607 need to be performed.

The preset thresholds in step 605 and step 604 may be different thresholds, and may be further set based on experience, simulation experiment, or the like.

It should be understood that in this application, step 606 and step 607 may be performed when the logical correlation coefficient exceeds the preset threshold and the resource correlation coefficient exceeds the preset threshold.

606. Add the candidate thread to an association thread group of the frame drawing thread.

607. Schedule a resource for the association thread group to accelerate execution of a thread in the association thread group.

In addition, when the logical correlation coefficient in step 603 does not exceed the preset threshold, information about the candidate thread may be recorded such that the candidate thread is excluded when an association thread is being subsequently determined, thereby accelerating a speed of determining the association thread.

Similarly, when the resource correlation coefficient in step 605 does not exceed the preset threshold, information about the candidate thread may also be recorded such that the candidate thread is excluded when an association thread is being subsequently determined.

A target resource scheduling manner is a scheduling manner estimated based on a load characteristic, a predicted load value, and the like of the frame drawing thread of an image frame. In actual scheduling, a resource scheduling speed may be relatively low due to inaccurate prediction of the predicted load value, and drawing of the image frame cannot be completed within a predetermined time.

Therefore, if the terminal device has not completed the drawing of the image frame within the predetermined time, an additional resource may be scheduled for the frame drawing thread to increase an execution speed of the frame drawing thread.

Optionally, in an embodiment, the method shown in FIG. 1 further includes the execution of the frame drawing thread is not completed within a predetermined time, and the method further includes scheduling an additional resource for the frame drawing thread until drawing of the image frame is completed, where the predetermined time is a time required for completing the execution of the frame drawing thread when a resource is scheduled for the frame drawing thread in the target resource scheduling manner.

It should be understood that the drawing of the image frame is completed once the execution of the frame drawing thread is completed. If the drawing of the image frame is not completed within the predetermined time, it indicates that fewer resources may be scheduled for the frame drawing thread in the target resource scheduling manner. In this case, an additional resource needs to be scheduled for the frame drawing thread to accelerate the execution of the frame drawing thread, thereby improving user experience.

Optionally, there is a positive correlation relationship between a size of the additional resource and a first difference, and the first difference is a difference between a time point of scheduling the additional resource and an end time point of the preset time.

When the first difference is larger, the predetermined time expires earlier. More resources are scheduled for the frame drawing thread such that the execution of the frame drawing thread is completed as soon as possible.

It should be understood that scheduling the additional resource for the frame drawing thread is stopped when the execution of the frame drawing thread is completed.

Optionally, in an embodiment, the method shown in FIG. 1 further includes determining whether the load characteristic of the frame drawing thread is a typical load characteristic, and when the load characteristic of the frame drawing thread is a typical load characteristic, storing the load characteristic of the frame drawing thread and the predicted load value of the frame drawing thread.

It should be understood that when the load characteristic of the frame drawing thread is a typical load characteristic, the predicted load value of the frame drawing thread is a load value corresponding to the typical load characteristic.

In this application, the typical load characteristic and the load value corresponding to the typical load characteristic are stored such that subsequently, the predicted load value is directly determined based on the load characteristic, and complexity of determining the predicted load value can be reduced.

Optionally, in an embodiment, determining whether the load characteristic of the frame drawing thread is a typical load characteristic includes determining whether a recorded load characteristic includes a load characteristic whose similarity to the load characteristic of the frame drawing thread is greater than or equal to a similarity threshold, and if the recorded load characteristic does not include a load characteristic whose similarity to the load characteristic of the frame drawing thread is greater than or equal to the similarity threshold, determining that the load characteristic of the frame drawing thread is a typical load characteristic.

It should be understood that when the recorded load characteristic includes a load characteristic whose similarity to the load characteristic of the frame drawing thread is greater than or equal to the similarity threshold, it indicates that the recorded load characteristic includes a load characteristic similar to the load characteristic of the frame drawing thread, and the load characteristic of the frame drawing thread does not need to be further recorded.

Figure 8:
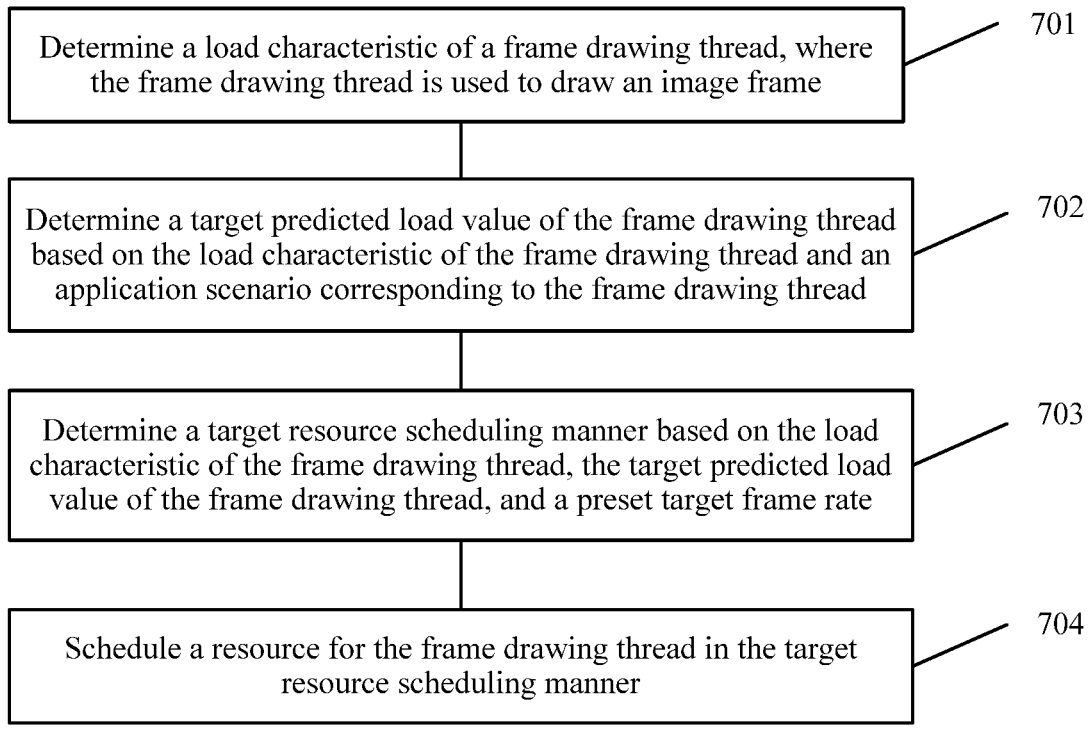
FIG. 8 is a schematic flowchart of a resource scheduling method according to an embodiment of this application.

FIG. 8 is a schematic flowchart of a resource scheduling method according to an embodiment of this application. The method shown in FIG. 8 may be performed by a terminal device. The terminal device herein may be a mobile terminal (for example, a smartphone), a computer, a personal digital assistant, a wearable device, a vehicle-mounted device, an internet of things device, or the like.

The method shown in FIG. 8 includes step 701 to step 704. The following describes the steps in detail.

701. Determine a load characteristic of a frame drawing thread, where the frame drawing thread is used to draw an image frame.

The frame drawing thread of the image frame may be determined before step 701. The image frame may be a frame that is currently to be displayed by the terminal device, and the image frame may be an image frame or the like. The frame drawing thread is a thread for drawing the image frame. An execution speed of the frame drawing thread directly affects a display speed of the image frame, and further affects user experience. Further, when the execution speed of the frame drawing thread is relatively low, it takes a relatively long time to display the image frame, and a user may feel that frame freezing occurs in an image, or when the execution speed of the frame drawing thread is relatively high, it does not need to take a very long time to display the image frame, and a user feels that an image is displayed relatively smoothly.

702. Determine a target predicted load value of the frame drawing thread based on the load characteristic of the frame drawing thread and an application scenario corresponding to the frame drawing thread.

The application scenario corresponding to the frame drawing thread may be a type of an application program in which the frame drawing thread is located. For example, the application scenario corresponding to the frame drawing thread may be a video application program, a game application program, or another application program (for example, WECHAT, TAOBAO, or WEIBO) in which interaction with a user is required.

In addition, the application scenario corresponding to the frame drawing thread may be a phase of an application program in which the frame drawing thread is located. For example, the application scenario corresponding to the frame drawing thread may be a start phase, an end phase, or the like of the application program in which the frame drawing thread is located.

Alternatively, the application scenario corresponding to the frame drawing thread may be a phase when an application program in which the frame drawing thread is located is run. For example, the application scenario corresponding to the frame drawing thread may be an interface (a chat interface or an interface in which a small video is open) of WECHAT.

703. Determine a target resource scheduling manner based on the load characteristic of the frame drawing thread, the target predicted load value of the frame drawing thread, and a preset target frame rate.

704. Schedule a resource for the frame drawing thread in the target resource scheduling manner.

In this application, the predicted load value of the frame drawing thread can be determined more properly based on the load characteristic of the frame drawing thread and the application scenario corresponding to the frame drawing thread, and further, the target resource scheduling manner can be determined more properly, to implement finer-granularity resource scheduling such that resource scheduling is more specific and a resource scheduling effect is better.

Optionally, in an embodiment, determining a target predicted load value of the frame drawing thread based on the load characteristic of the frame drawing thread and an application scenario corresponding to the frame drawing thread includes determining a first predicted load value of the frame drawing thread based on the load characteristic of the frame drawing thread, determining a second predicted load value based on the application scenario corresponding to the frame drawing thread and fourth mapping relationship information, where the fourth mapping relationship information includes a plurality of application scenarios and a load value corresponding to each of the plurality of application scenarios, and determining the target predicted load value based on the first predicted load value and the second predicted load value.

For example, when the terminal device starts an application, it can be recognized that the application is in an application start scenario, and then a load value corresponding to the application start scenario is determined based on a pre-allocated guideline (GL) table (the pre-allocated GL table may include the fourth mapping relationship information), to obtain the second predicted load value. The GL table is similar to a configuration file, and the GL table includes load values corresponding to different scenarios and resource scheduling manners (whether a large core or a small core is selected, a value of a frequency, and the like) corresponding to the different scenarios. Load values or resource scheduling manners corresponding to different application scenarios can be determined based on the GL table.

It should be understood that after the first predicted load value and the second predicted load value are obtained, the target predicted load value may be determined in a plurality of manners. The following describes several possible manners.

Manner 1: A maximum load value in the first predicted load value and the second predicted load value is determined as the target predicted load value.

Manner 2: A minimum load value in the first predicted load value and the second predicted load value is determined as the target predicted load value.

Manner 3: An average value of the first predicted load value and the second predicted load value is determined as the target predicted load value.

In addition, weighted summation may be performed on the first predicted load value and the second predicted load value, and a sum of a product of the first predicted load value and a first weighting coefficient and a product of the second predicted load value and a second weighting coefficient may be determined as the target predicted load value, where the first weighting coefficient and the second weighting coefficient may be preset values.

When the application scenario has relatively large impact on the load value, a relatively large first weighting coefficient may be set, or when the application scenario has relatively small impact on the load value, a relatively small first weighting coefficient may be set.

Optionally, determining a target predicted load value of the frame drawing thread based on the load characteristic of the frame drawing thread and an application scenario corresponding to the frame drawing thread includes when the application scenario corresponding to the frame drawing thread is a start scenario, determining the target predicted load value of the frame drawing thread based on the application scenario corresponding to the frame drawing thread and fourth mapping relationship information, where the fourth mapping relationship information includes a plurality of application scenarios and a load value corresponding to each of the plurality of application scenarios.

When the scenario corresponding to the frame drawing thread is the start scenario, because a load value corresponding to the start scenario is relatively large, the target predicted load value of the frame drawing thread may be directly determined based on the application scenario of the frame drawing thread.

Optionally, determining a target predicted load value of the frame drawing thread based on the load characteristic of the frame drawing thread and an application scenario corresponding to the frame drawing thread includes when the application scenario corresponding to the frame drawing thread is a scenario other than a start scenario, determining the target predicted load value based on the load characteristic of the frame drawing thread.

Optionally, in an embodiment, the load characteristic of the frame drawing thread is used to indicate a resource requirement feature of the frame drawing thread.

Further, the load characteristic of the frame drawing thread may indicate whether load of the frame drawing thread is computing-intensive or resource-intensive such that the corresponding target resource scheduling manner is subsequently determined.

For example, when the load of the frame drawing thread is computing-intensive load, a computing resource is mainly scheduled for the frame drawing thread, or when the load of the frame drawing thread is resource-intensive load, a storage resource is mainly scheduled for the frame drawing thread.

It should be understood that the load characteristic of the frame drawing thread may further indicate that the load of the frame drawing thread is computing-intensive and resource-intensive, and in this case, both a computing resource and a storage resource need to be scheduled for the frame drawing thread.

Optionally, in an embodiment, the load characteristic of the frame drawing thread includes at least one of an average quantity of CPI, a quantity of branch instructions, and a cache miss rate of the frame drawing thread.

In this application, when one or more of parameters such as the average quantity of CPI, the quantity of branch instructions, and the cache miss rate of the frame drawing thread are collected, the load characteristic of the frame drawing thread can be directly obtained such that complexity of obtaining the load characteristic of the frame drawing thread is reduced.

It should be understood that one or more of parameters such as the average quantity of CPI, the quantity of branch instructions, and the cache miss rate of the frame drawing thread may be directly used to indicate the load characteristic of the frame drawing thread. The load characteristic of the frame drawing thread is obtained once these parameters of the frame drawing thread are obtained.

Optionally, the load characteristic of the frame drawing thread is determined based on at least one of an average quantity of CPI, a quantity of branch instructions, and a cache miss rate of the frame drawing thread in a first time interval, and the first time interval is a period of time between start of execution of the frame drawing thread and end of the execution of the frame drawing thread.

The average quantity of CPI, the quantity of branch instructions, and the cache miss rate of the frame drawing thread in the first time interval may be referred to as performance indicator data of the frame drawing thread in the first time interval. When the load characteristic of the frame drawing thread is being determined, some parameters in the performance indicator data of the frame drawing thread in the first time interval may be directly determined as the load characteristic of the frame drawing thread, or processing or an operation may be performed on the performance indicator data of the frame drawing thread in the first time interval (for example, division is performed on two parameters in the performance indicator data, or a hash operation is performed on some parameters in the performance indicator data), and data obtained after the processing or the operation is determined as the load characteristic of the frame drawing thread.

Optionally, the execution of the frame drawing thread is not completed within a predetermined time, and the method shown in FIG. 8 further includes scheduling an additional resource for the frame drawing thread until drawing of the image frame is completed, where the predetermined time is a time required for completing the execution of the frame drawing thread when a resource is scheduled for the frame drawing thread in the target resource scheduling manner.

It should be understood that the drawing of the image frame is completed once the execution of the frame drawing thread is completed. If the drawing of the image frame is not completed within the predetermined time, it indicates that fewer resources may be scheduled for the frame drawing thread in the target resource scheduling manner. In this case, an additional resource needs to be scheduled for the frame drawing thread to accelerate the execution of the frame drawing thread, thereby improving user experience.

Optionally, there is a positive correlation relationship between a size of the additional resource and a first difference, and the first difference is a difference between a time point of scheduling the additional resource and an end time point of the preset time.

When the first difference is larger, the predetermined time expires earlier. More resources are scheduled for the frame drawing thread such that the execution of the frame drawing thread is completed as soon as possible.

The first mapping relationship information, the second mapping relationship information, the third mapping relationship information, and the fourth mapping relationship information occur in the foregoing description. To better understand meanings of the mapping relationship information, the following describes the meanings of the mapping relationship information with reference to Table 6.

TABLE 6

| Mapping relationship information | Meaning |
| --- | --- |
| First mapping relationship information | Include a plurality of pieces of load information and a resource scheduling manner corresponding to each of the plurality of pieces of load information |
| Second mapping relationship information | Include a plurality of load characteristics and a load value corresponding to each of the plurality of load characteristics |
| Third mapping relationship information | Include a plurality of load characteristics and a resource scheduling manner corresponding to each of the plurality of load characteristics |
| Fourth mapping relationship information | Include a plurality of scenarios and a load value corresponding to each of the plurality of scenarios |

In this application, the various mapping relationship information may be prestored, and the various mapping information may be determined based on historical information recorded by the terminal device (the historical information may include a correspondence between some of load information, a load characteristic, an application scenario, a load value, and a resource scheduling manner). In addition, after execution of the image frame is completed, the various mapping relationship information may be further updated based on information such as load information, a load characteristic, a predicted load value, and a corresponding resource scheduling manner of the image frame such that the predicted load value, the target resource scheduling manner, or the like corresponding to the frame drawing thread is subsequently determined based on the various mapping relationship information.

Figure 10:
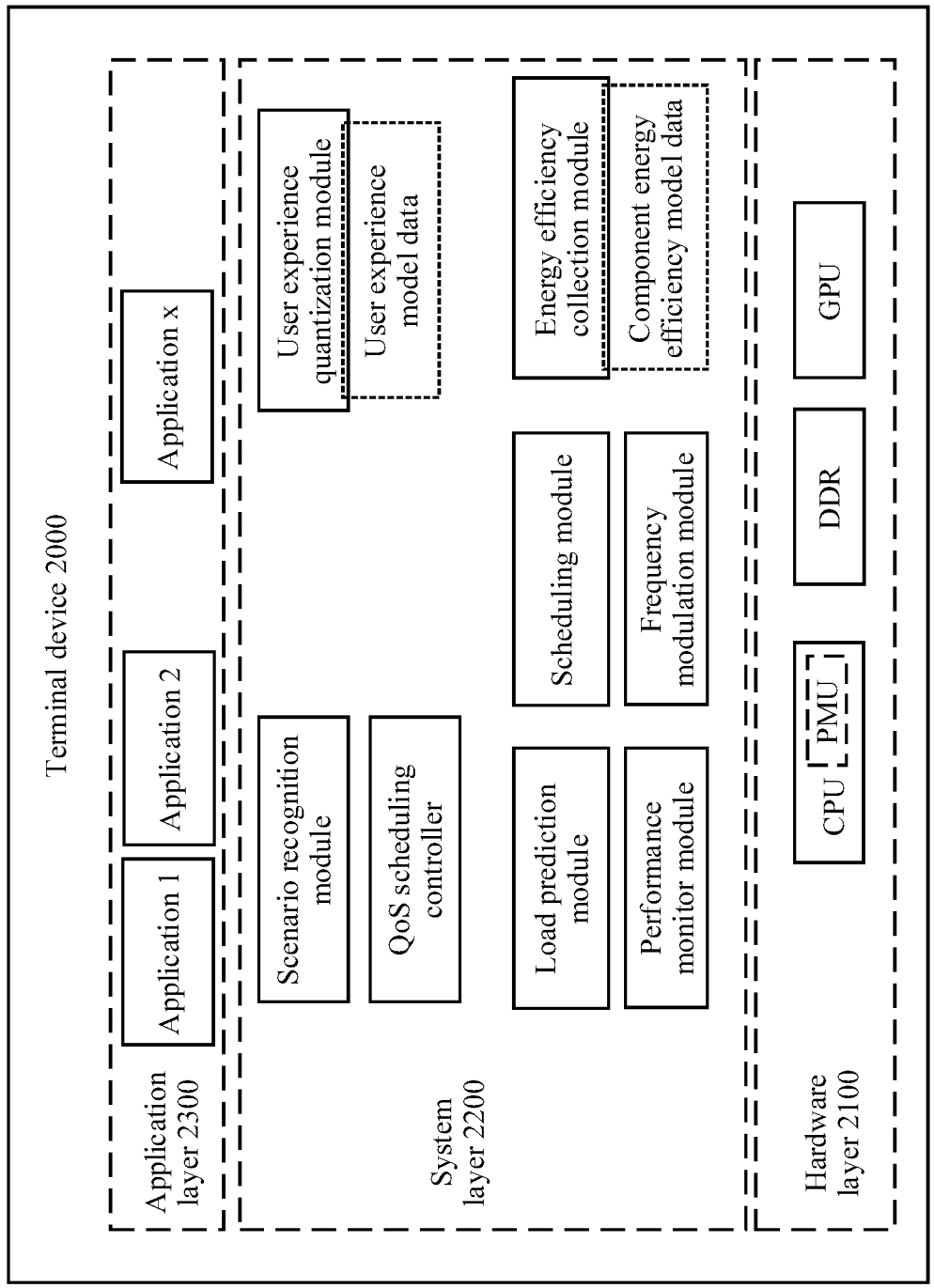
FIG. 10 is a schematic block diagram of a terminal device according to an embodiment of this application.
Figure 11:
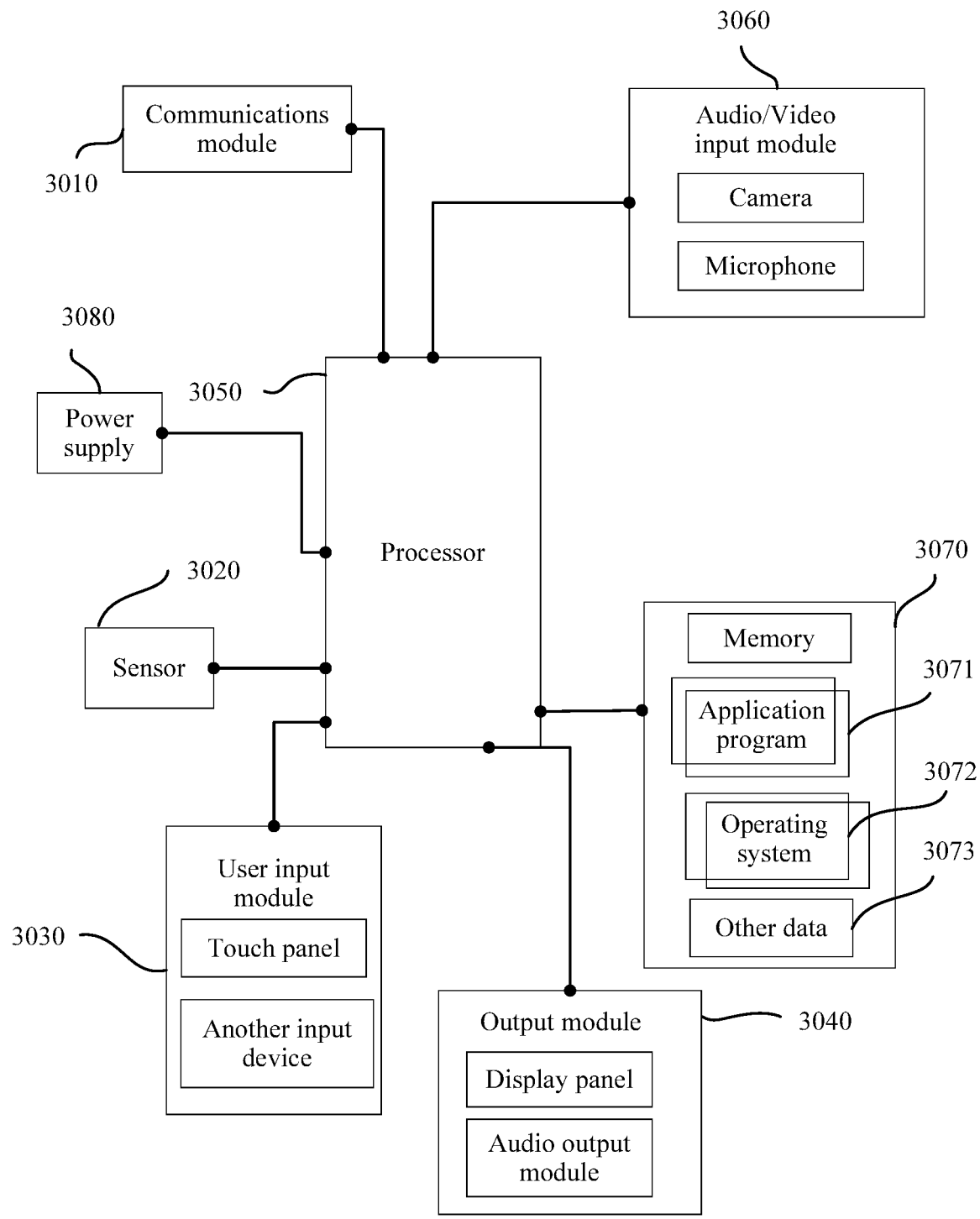
FIG. 11 is a schematic structural diagram of a terminal device according to an embodiment of this application.

The foregoing describes the resource scheduling manner in the embodiments of this application in detail with reference to FIG. 1 to FIG. 8. The following describes a terminal device in the embodiments of this application with reference to FIG. 9 to FIG. 11. It should be understood that terminal devices in FIG. 9 to FIG. 11 can perform the steps in the resource scheduling method in the embodiments of this application. To avoid repetition, repeated descriptions are appropriately omitted when the terminal devices in FIG. 9 to FIG. 11 are described below.

Figure 9:
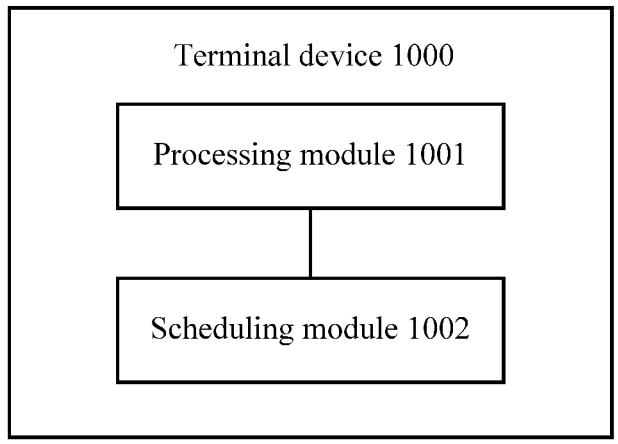
FIG. 9 is a schematic block diagram of a terminal device according to an embodiment of this application.

FIG. 9 is a schematic block diagram of a terminal device according to an embodiment of this application. The terminal device 1000 in FIG. 9 includes a processing module 1001 and a scheduling module 1002. The processing module 1001 and the scheduling module 1002 can perform the steps in the resource scheduling methods in FIG. 1 to FIG. 8 in the embodiments of this application.

Further, when the terminal device 1000 is configured to perform the method shown in FIG. 1, specific functions of the processing module 1001 and the scheduling module 1002 are as follows.

The processing module 1001 is configured to determine a load characteristic of a frame drawing thread, where the frame drawing thread is used to draw an image frame, and determine a target resource scheduling manner based on the load characteristic of the frame drawing thread.

The scheduling module 1002 is configured to schedule a resource for the frame drawing thread in the target resource scheduling manner.

In this application, because the frame drawing thread is a thread for drawing an image frame, and an execution speed of the frame drawing thread is directly related to user experience, performing scheduling for the frame drawing thread in the target resource scheduling manner determined using the load characteristic of the frame drawing thread can implement finer-granularity resource scheduling such that resource scheduling is more specific and a resource scheduling effect is better.

When the terminal device 1000 is configured to perform the method shown in FIG. 8, specific functions of the processing module 1001 and the scheduling module 1002 are as follows.

The processing module 1001 is configured to determine a load characteristic of a frame drawing thread, where the frame drawing thread is used to draw an image frame, determine a target predicted load value of the frame drawing thread based on the load characteristic of the frame drawing thread and an application scenario corresponding to the frame drawing thread, and determine a target resource scheduling manner based on the load characteristic of the frame drawing thread, the target predicted load value of the frame drawing thread, and a preset target frame rate.

The scheduling module 1002 is configured to schedule a resource for the frame drawing thread in the target resource scheduling manner.

In this application, the predicted load value of the frame drawing thread can be determined more properly based on the load characteristic of the frame drawing thread and the application scenario corresponding to the frame drawing thread, and further, the target resource scheduling manner can be determined more properly, to implement finer-granularity resource scheduling such that resource scheduling is more specific and a resource scheduling effect is better.

FIG. 10 is a schematic block diagram of a terminal device according to an embodiment of this application. The terminal device 2000 in FIG. 10 may be divided into a hardware layer 2100, a system layer 2200, and an application layer 2300.

As shown in FIG. 10, the hardware layer 2100 mainly includes some physical modules or units, and the hardware layer 2100 may include a CPU, a double data rate (DDR) synchronous dynamic random access memory (SDRAM), and a graphics processing unit (GPU). The CPU may further include a performance monitor unit (PMU).

It should be understood that the steps in the resource scheduling methods in the embodiments of this application may be finally performed by the CPU.

As shown in FIG. 10, the system layer 2200 may include a scenario recognition module, a user experience quantization module, a quality of service (QoS) scheduling controller, a load prediction module, a scheduling module, an energy efficiency collection module, a performance monitor module, a uniform frequency modulation module, a frame rendering subsystem, a media subsystem, a grid subsystem, and a memory management subsystem.

Specific functions of the modules in the system layer 2200 are as follows.

The scenario recognition module is configured to recognize a scenario currently used by a user (for example, may recognize whether the user watches a video or views an open web page).

The user experience quantization module is configured to capture system frame window information in real time and deliver the system frame window information to a kernel, where the frame window information mainly refers to start time points and end time points of participating in a frame drawing operation by computing components such as the CPU and the GPU in a frame drawing process, and the frame window information is used to quantize user experience, to convert experience such as "frame freezing" that can be perceived by the user into specific data that can be perceived by the kernel.

The QoS controller is configured to deliver a performance constraint and a target frame rate of the recognized current scenario based on the current scenario.

The load prediction module is configured to predict load of a frame drawing thread to obtain a predicted load value of the frame drawing thread, where the predicted load value may be a workload required for completing the execution of frame drawing thread, and the workload includes but is not limited to a workload that needs to be completed by a hard component such as the CPU, the GPU, or the DDR.

The scheduling module is configured to determine, based on information such as the load predicted by the load prediction module and a cut-off time (the execution of the frame drawing thread needs to be completed within a cut-off time) indicator delivered by the upper-layer QoS module, a resource supply and thread scheduling for the frame drawing thread (and an association thread).

The energy efficiency collection module is configured to collect current system power consumption in real time to determine different resource scheduling manners with an optimal energy consumption ratio.

The performance monitor module is configured to collect a performance working status of a computing component, to indicate a frame characteristic based on the status.

The frequency modulation module is configured to adjust a working frequency of the CPU.

The frame rendering subsystem is configured to render a to-be-displayed frame.

As shown in FIG. 10, the application layer 2300 may include an application 1, an application 2, . . . , an application x, and the like. The application 1, the application 2, . . . , and the application x represent different application program entities. For example, the application 1 may be WECHAT, and the application 2 may be WEIBO.

It should be understood that the image frame in this application may be a currently to-be-displayed image frame in an application in the application layer 2300 shown in FIG. 10.

The terminal device shown in FIG. 9 and FIG. 10 may be a mobile terminal (for example, a smartphone), a computer, a personal digital assistant, a wearable device, a vehicle-mounted device, an internet of things device, an artificial intelligence device, or the like.

FIG. 11 is a schematic structural diagram of a terminal device according to an embodiment of this application.

The terminal device in FIG. 11 includes a communications module 3010, a sensor 3020, a user input module 3030, an output module 3040, a processor 3050, an audio/video input module 3060, a memory 3070, and a power supply 3080. The following describes the modules in detail.

The communications module 3010 may include at least one module that can enable the terminal device to communicate with another terminal device. For example, the communications module 3010 may include one or more of a wired network interface, a broadcast receiving module, a mobile communications module, a wireless Internet module, a local area communications module, a location (or positioning) information module, and the like.

The sensor 3020 may sense some operations of a user, and the sensor 3020 may include a distance sensor, a touch sensor, and the like. The sensor 3020 may sense an operation such as touching a screen or approaching a screen by the user.

The user input module 3030 is configured to receive entered digital information or character information or a contact touch operation/contactless gesture, and receive signal input related to user settings and function control of a system, and the like. The user input module 3030 includes a touch panel and/or another input device.

The output module 3040 includes a display panel configured to display information entered by the user, information provided for the user, various menu interfaces of the system, and the like. Optionally, the display panel may be configured in a form of a liquid-crystal display (LCD), an organic light-emitting diode (OLED), or the like. In some other embodiments, the touch panel may cover the display panel, to form a touch display screen. In addition, the output module 3040 may further include an audio output module, an alarm, a tactile module, and the like.

The audio/video input module 3060 is configured to input an audio signal or a video signal. The audio/video input module 3060 may include a camera and a microphone.

The power supply 3080 may receive external power and internal power under control of the processor 3050, and provide power required for running the modules in the terminal device.

The processor 3050 may indicate one or more processors. For example, the processor 3050 may include one or more CPUs, one CPU and one GPU, or one application processor and one coprocessor (for example, a micro control unit or a neural network processor). When the processor 3050 includes a plurality of processors, the plurality of processors may be integrated into a same chip, or may be independent chips. One processor may include one or more physical cores, and the physical core is a minimum processing module.

The memory 3070 stores a computer program, and the computer program includes an operating system program 3072, an application program 3071, and the like. A typical operating system includes a system used in a desktop computer or a notebook computer, for example, WINDOWS of MICROSOFT or IOS of APPLE, and also includes a system used in a mobile terminal, for example, a Linux®-based ANDROID system developed by GOOGLE. When the resource scheduling method in the embodiments of this application is implemented through software, it may be considered that the resource scheduling method is further implemented using the application program 3071.

The memory 3070 may be one or more of the following types: a flash memory, a memory of a hard disk type, a memory of a micro multimedia card type, a card-type memory (for example, an Secure Digital (SD) or eXtreme Digital (XD) memory), a random-access memory (RAM), a static RAM (SRAM), a read-only memory (ROM), a programmable ROM (PROM), electrically erasable PROM (EEPROM), a magnetic memory, a magnetic disk, or an optical disc. In some other embodiments, the memory 3070 may be a network storage device on the Internet. The system may perform an operation such as updating or reading on the memory 3070 on the Internet.

The processor 3050 is configured to read the computer program from the memory 3070, and then perform a method defined by the computer program. For example, the processor 3050 reads the operating system program 3072, to run an operating system in the system and implement various functions of the operating system, or reads one or more application programs 3071, to run an application in the system.

For example, the memory 3070 may store a computer program (the computer program is a program corresponding to the resource scheduling method in the embodiments of this application). When the processor 3050 executes the computer program, the processor 3050 can perform the resource scheduling method in the embodiments of this application.

The memory 3070 further stores data 3073 other than the computer program. For example, the memory 3070 may store a load characteristic of a frame drawing thread, a predicted load value of the frame drawing thread, and the like in the resource scheduling method in this application.

A connection relationship among the modules in FIG. 11 is only an example. The method provided in any embodiment of this application may also be applied to a terminal device using another connection manner. For example, all modules are connected using a bus.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and there may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A resource scheduling method implemented by a device, wherein the resource scheduling method comprises:
   determining a first time interval using a frame drawing time of an image frame, wherein the first time interval is shorter than the frame drawing time;
   determining the first time interval based on a proportion threshold such that the first time interval does not exceed a first proportion of the frame drawing time, wherein the first proportion corresponds to the proportion threshold;
   collecting performance indicator data of a frame drawing thread while actively processing a drawing of the image frame and for a duration corresponding to the first time interval, wherein the frame drawing thread draws the image frame;
   determining a first load characteristic of the frame drawing thread based on the performance indicator data;
   determining a predicted load value of the frame drawing thread based on the first load characteristic;
   determining a target resource scheduling manner based on the first load characteristic and the predicted load value; and
   scheduling a first resource for the frame drawing thread in the target resource scheduling manner, wherein the first resource comprises at least one of a computing resource or a storage resource.

2. The resource scheduling method of claim 1, wherein the first load characteristic comprises at least one of an average quantity of cycles per instruction (CPI), a quantity of branch instructions, or a cache miss rate of the frame drawing thread.

3. The resource scheduling method of claim 1, further comprising determining the first load characteristic based on at least one of an average quantity of cycles per instruction (CPI), a quantity of branch instructions, or a cache miss rate of the frame drawing thread in the first time interval.

4. The resource scheduling method of claim 1, further comprising determining the target resource scheduling manner based on the first load characteristic, the predicted load value, and a preset target frame rate.

5. The resource scheduling method of claim 4, further comprising:
   determining a plurality of resource scheduling manners of scheduling the first resource for the frame drawing thread based on the first load characteristic, the predicted load value, and the preset target frame rate; and
   determining a resource scheduling manner with a lowest power consumption in the resource scheduling manners as the target resource scheduling manner.

6. The resource scheduling method of claim 1, further comprising determining the target resource scheduling manner based on the first load characteristic, the predicted load value, and first mapping relationship information, wherein the first mapping relationship information comprises a plurality of pieces of load information and a resource scheduling manner corresponding to each of the pieces of load information, and wherein each of the pieces of load information comprise one load characteristic and one load value.

7. The resource scheduling method of claim 4, further comprising determining the predicted load value based on the first load characteristic and second mapping relationship information, wherein the second mapping relationship information comprises a plurality of load characteristics and a load value corresponding to each of the load characteristics.

8. The resource scheduling method of claim 7, further comprising determining a load value corresponding to a reference load characteristic as the predicted load value when the load characteristics in the second mapping relationship information comprise the reference load characteristic, wherein a similarity between the reference load characteristic and the first load characteristic is greater than or equal to a similarity threshold.

9. The resource scheduling method of claim 7, further comprising determining, as the predicted load value, a load value of a frame preceding the image frame that is drawn using the frame drawing thread when the load characteristics in the second mapping relationship information do not comprise a reference load characteristic, wherein a similarity between the reference load characteristic and the first load characteristic is greater than or equal to a similarity threshold.

10. The resource scheduling method of claim 1, further comprising determining the target resource scheduling manner based on the first load characteristic and third mapping relationship information, wherein the third mapping relationship information comprises a plurality of load characteristics and a resource scheduling manner corresponding to each of the load characteristics.

11. The resource scheduling method of claim 10, further comprising determining a resource scheduling manner corresponding to a reference load characteristic as the target resource scheduling manner when the load characteristics in the third mapping relationship information comprise the reference load characteristic, wherein a similarity between the reference load characteristic and the first load characteristic is greater than or equal to a similarity threshold.

12. The resource scheduling method of claim 10, further comprising determining, as the target resource scheduling manner, a resource scheduling manner of a second frame drawing thread of a frame preceding the image frame that is drawn using the frame drawing thread when the load characteristics in the third mapping relationship information do not comprise a reference load characteristic, wherein a similarity between the reference load characteristic and the first load characteristic is greater than or equal to a similarity threshold.

13. The resource scheduling method of claim 1, further comprising:
   determining an association thread of the frame drawing thread, wherein the association thread is capable of causing the frame drawing thread to sleep; and
   scheduling a second resource for the association thread to accelerate execution of the association thread.

14. The resource scheduling method of claim 1, wherein execution of the frame drawing thread is not completed within a predetermined time, wherein the resource scheduling method further comprises scheduling an additional resource for the frame drawing thread to accelerate the execution of the frame drawing thread, and wherein the predetermined time is a time required for completing the execution of the frame drawing thread when a resource is scheduled for the frame drawing thread in the target resource scheduling manner.

15. The resource scheduling method of claim 14, wherein a positive correlation relationship is between a size of the additional resource and a first difference, and wherein the first difference is between a time point of scheduling the additional resource and an end time point of the predetermined time.

16. A resource scheduling method implemented by a terminal device, wherein the resource scheduling method comprises:
 determining a first time interval using a frame drawing time of an image frame, wherein the first time interval is shorter than the frame drawing time;
 determining the first time interval based on a proportion threshold such that the first time interval does not exceed a first proportion of the frame drawing time, wherein the first proportion corresponds to the proportion threshold;
 collecting performance indicator data of a frame drawing thread while actively processing a drawing of the image frame and for a duration corresponding to the first time interval, wherein the frame drawing thread draws the image frame;
 determining a load characteristic of the frame drawing thread based on the performance indicator data;
 determining a target predicted load value of the frame drawing thread based on the load characteristic and an application scenario corresponding to the frame drawing thread;
 determining a target resource scheduling manner based on the load characteristic, the target predicted load value, and a preset target frame rate; and
 scheduling a resource for the frame drawing thread in the target resource scheduling manner, wherein the resource comprises at least one of a computing resource or a storage resource.

17. The resource scheduling method of claim 16, further comprising:
 determining a first predicted load value of the frame drawing thread based on the load characteristic;
 determining a second predicted load value based on the application scenario and fourth mapping relationship information, wherein the fourth mapping relationship information comprises a plurality of application scenarios and a load value corresponding to each of the application scenarios; and
 determining the target predicted load value based on the first predicted load value and the second predicted load value.

18. The resource scheduling method of claim 16, wherein the load characteristic comprises an average quantity of cycles per instruction (CPI).

19. A resource scheduling apparatus comprising:
 a memory configured to store computer instructions; and
 a processor coupled to the memory, wherein when executed by the processor, the computer instructions cause the processor to be configured to:
  determine a first time interval using a frame drawing time of an image frame, wherein the first time interval is shorter than the frame drawing time;
  determine the first time interval based on a proportion threshold such that the first time interval does not exceed a first proportion of the frame drawing time, wherein the first proportion corresponds to the proportion threshold;
  collect performance indicator data of a frame drawing thread while actively processing a drawing of the image frame and for a duration corresponding to the first time interval, wherein the frame drawing thread draws the image frame;
  determine a first load characteristic of the frame drawing thread based on the performance indicator data;
  determine a predicted load value of the frame drawing thread based on the first load characteristic;
  determine a target resource scheduling manner based on the first load characteristic, the predicted load value, and a preset target frame rate; and
  schedule a resource for the frame drawing thread in the target resource scheduling manner, wherein the resource comprises at least one of a computing resource or a storage resource.

* * * * *